(12) United States Patent
Besehanic

(10) Patent No.: US 11,277,662 B2
(45) Date of Patent: Mar. 15, 2022

(54) METHODS AND APPARATUS TO MEASURE EXPOSURE TO STREAMING MEDIA

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 21 days.

(21) Appl. No.: 16/788,976

(22) Filed: Feb. 12, 2020

(65) Prior Publication Data

US 2020/0186877 A1 Jun. 11, 2020

Related U.S. Application Data

(63) Continuation of application No. 16/296,632, filed on Mar. 8, 2019, now Pat. No. 10,721,524, which is a
(Continued)

(51) Int. Cl.
*H04N 21/435* (2011.01)
*H04N 21/442* (2011.01)
(Continued)

(52) U.S. Cl.
CPC ..... *H04N 21/44213* (2013.01); *H04N 21/258* (2013.01); *H04N 21/435* (2013.01);
(Continued)

(58) Field of Classification Search
CPC ........... H04N 21/44213; H04N 21/258; H04N 21/435; H04N 21/437; H04N 21/44222; H04N 21/6582; H04N 21/6587
See application file for complete search history.

(56) References Cited

U.S. PATENT DOCUMENTS 3,056,135 A 9/1962 Currey et al.
4,230,990 A 10/1980 Lert, Jr. et al.
(Continued)

FOREIGN PATENT DOCUMENTS

AU 2006203639 9/2006
AU 2013205736 5/2013
(Continued)

OTHER PUBLICATIONS

"Nielsen Unveils New Online Advertising Measurement," The Nielsen Company, Sep. 27, 2010, [retrieved from Internet at http://nielsen.com/us/en/insights/pressroom/2010/nielsen_unveils_newonlineadvertisingmeasurement.html on May 31, 2012] 3 pages.
(Continued)

*Primary Examiner* — Jefferey F Harold
*Assistant Examiner* — Alexander Boyd
(74) *Attorney, Agent, or Firm* — Hanley, Flight & Zimmerman, LLC

(57) ABSTRACT

Methods and apparatus to measure exposure to streaming media are disclosed. An example apparatus includes a processor, and memory including machine readable instructions that, when executed, cause the processor to: extract a series of tags associated with media playing on a presentation device, different ones of the tags in the series of the tags embedded in the media at different temporal positions within a duration of the media; identify a first tag from the series of tags to report to a central facility, the first tag identified based on a temporal proximity of the first tag to an event associated with the media playing on the presentation device; and transmit the identified first tag to the central facility, other tags in the series of tags not being transmitted to the central facility.

48 Claims, 8 Drawing Sheets

Related U.S. Application Data continuation of application No. 15/638,127, filed on Jun. 29, 2017, now Pat. No. 10,231,013, which is a continuation of application No. 14/266,118, filed on Apr. 30, 2014, now Pat. No. 9,699,499.

(51) Int. Cl.
*H04N 21/437* (2011.01)
*H04N 21/6587* (2011.01)
*H04N 21/258* (2011.01)
*H04N 21/658* (2011.01)

(52) U.S. Cl.
CPC ..... *H04N 21/437* (2013.01); *H04N 21/44222* (2013.01); *H04N 21/6582* (2013.01); *H04N 21/6587* (2013.01)

(56) References Cited

U.S. PATENT DOCUMENTS

| | | |
|---|---|---|
| 4,245,245 A | 1/1981 | Matsumoto et al. |
| 4,279,433 A | 7/1981 | Petaja |
| 4,408,345 A | 10/1983 | Yashiro et al. |
| 4,461,241 A | 7/1984 | Ostler |
| 4,495,496 A | 1/1985 | Miller, III |
| 4,567,511 A | 1/1986 | Smith et al. |
| 4,647,974 A | 3/1987 | Butler et al. |
| 4,658,357 A | 4/1987 | Carroll et al. |
| 4,677,466 A | 6/1987 | Lert, Jr. et al. |
| 4,688,026 A | 8/1987 | Scribner et al. |
| 4,697,209 A | 9/1987 | Kiewit et al. |
| 4,745,468 A | 5/1988 | Von Kohorn |
| 4,814,751 A | 3/1989 | Hawkins et al. |
| 4,833,452 A | 5/1989 | Currier |
| 4,853,692 A | 8/1989 | Wolk et al. |
| 4,876,592 A | 10/1989 | Von Kohorn |
| 4,876,736 A | 10/1989 | Kiewit |
| 4,899,135 A | 2/1990 | Ghahariiran |
| 4,926,255 A | 5/1990 | Von Kohorn |
| 4,930,011 A | 5/1990 | Kiewit |
| 4,943,963 A | 7/1990 | Waechter et al. |
| 4,955,000 A | 9/1990 | Nastrom |
| 4,972,503 A | 11/1990 | Zurlinden |
| 4,990,892 A | 2/1991 | Guest et al. |
| 5,006,830 A | 4/1991 | Merritt |
| 5,019,899 A | 5/1991 | Boles et al. |
| 5,023,929 A | 6/1991 | Call |
| 5,062,151 A | 10/1991 | Shipley |
| 5,070,329 A | 12/1991 | Jasinaki |
| 5,081,680 A | 1/1992 | Bennett |
| 5,086,290 A | 2/1992 | Murray et al. |
| 5,119,104 A | 6/1992 | Heller |
| 5,146,231 A | 9/1992 | Ghaem et al. |
| 5,155,591 A | 10/1992 | Wachob |
| 5,210,820 A | 5/1993 | Kenyon |
| 5,266,944 A | 11/1993 | Carroll et al. |
| 5,278,988 A | 1/1994 | Dejean et al. |
| 5,291,399 A | 3/1994 | Chaco |
| 5,317,309 A | 5/1994 | Vercellotti et al. |
| 5,357,254 A | 10/1994 | Kah, Jr. |
| 5,359,697 A | 10/1994 | Smith et al. |
| 5,387,993 A | 2/1995 | Heller et al. |
| 5,396,224 A | 3/1995 | Dukes et al. |
| 5,396,227 A | 3/1995 | Carroll et al. |
| 5,410,344 A | 4/1995 | Graves et al. |
| 5,425,100 A | 6/1995 | Thomas et al. |
| 5,436,653 A | 7/1995 | Ellis et al. |
| 5,455,560 A | 10/1995 | Owen et al. |
| 5,461,390 A | 10/1995 | Hoshen |
| 5,465,082 A | 11/1995 | Chaco |
| 5,471,404 A | 11/1995 | Mazer |
| 5,475,367 A | 12/1995 | Prevost |
| 5,481,294 A | 1/1996 | Thomas et al. |
| 5,483,276 A | 1/1996 | Brooks et al. |
| 5,512,933 A | 4/1996 | Wheatley et al. |
| 5,515,426 A | 5/1996 | Yacenda et al. |
| 5,548,637 A | 8/1996 | Heller et al. |
| 5,550,928 A | 8/1996 | Lu et al. |
| 5,561,412 A | 10/1996 | Novak et al. |
| 5,568,119 A | 10/1996 | Schipper et al. |
| 5,574,962 A | 11/1996 | Fardeau et al. |
| 5,584,050 A | 12/1996 | Lyons |
| 5,588,005 A | 12/1996 | Ali et al. |
| 5,594,786 A | 1/1997 | Chaco et al. |
| 5,594,934 A | 1/1997 | Lu et al. |
| 5,621,388 A | 4/1997 | Sherburne et al. |
| 5,635,907 A | 6/1997 | Bernard et al. |
| 5,636,245 A | 6/1997 | Ernst et al. |
| 5,640,192 A | 6/1997 | Garfinkle |
| 5,650,769 A | 7/1997 | Campana, Jr. |
| 5,650,770 A | 7/1997 | Schlager et al. |
| 5,659,366 A | 8/1997 | Kerman |
| 5,675,371 A | 10/1997 | Barringer |
| 5,675,510 A | 10/1997 | Coffey et al. |
| 5,682,139 A | 10/1997 | Pradeep et al. |
| 5,686,888 A | 11/1997 | Welles, II et al. |
| 5,686,902 A | 11/1997 | Reis et al. |
| 5,689,229 A | 11/1997 | Chaco et al. |
| 5,691,980 A | 11/1997 | Welles, II et al. |
| 5,699,038 A | 12/1997 | Ulrich et al. |
| 5,705,980 A | 1/1998 | Shapiro |
| 5,708,421 A | 1/1998 | Boyd |
| 5,715,325 A | 2/1998 | Bang et al. |
| 5,717,717 A | 2/1998 | Yang et al. |
| 5,719,634 A | 2/1998 | Keery et al. |
| 5,729,829 A | 3/1998 | Talwar et al. |
| 5,731,757 A | 3/1998 | Layson, Jr. |
| 5,734,413 A | 3/1998 | Lappington et al. |
| 5,737,363 A | 4/1998 | Dinkins |
| 5,742,237 A | 4/1998 | Bledsoe |
| 5,751,246 A | 5/1998 | Hertel |
| 5,754,939 A | 5/1998 | Herz et al. |
| 5,760,704 A | 6/1998 | Barton et al. |
| 5,793,290 A | 8/1998 | Eagleson et al. |
| 5,808,564 A | 9/1998 | Simms et al. |
| 5,812,056 A | 9/1998 | Law |
| 5,815,671 A | 9/1998 | Morrison |
| 5,822,418 A | 10/1998 | Yacenda et al. |
| 5,822,544 A | 10/1998 | Chaco et al. |
| 5,828,402 A | 10/1998 | Collings |
| 5,838,223 A | 11/1998 | Gallant et al. |
| 5,841,978 A | 11/1998 | Rhoads |
| 5,848,155 A | 12/1998 | Cox |
| 5,850,249 A | 12/1998 | Massetti et al. |
| 5,867,205 A | 2/1999 | Harrison |
| 5,872,588 A | 2/1999 | Aras et al. |
| 5,880,789 A | 3/1999 | Inaba |
| 5,889,548 A | 3/1999 | Chan |
| 5,893,067 A | 4/1999 | Bender et al. |
| 5,917,425 A | 6/1999 | Crimmins et al. |
| 5,918,223 A | 6/1999 | Blum et al. |
| 5,920,641 A | 7/1999 | Uebereiter et al. |
| 5,930,369 A | 7/1999 | Cox et al. |
| 5,956,716 A | 9/1999 | Kenner et al. |
| 5,966,120 A | 10/1999 | Arazi et al. |
| 5,973,683 A | 10/1999 | Cragun et al. |
| 5,974,299 A | 10/1999 | Massetti |
| 5,982,808 A | 11/1999 | Otto |
| 5,987,306 A | 11/1999 | Nilsen et al. |
| 6,002,918 A | 12/1999 | Heiman et al. |
| 6,009,333 A | 12/1999 | Chaco |
| 6,052,730 A | 4/2000 | Felciano et al. |
| 6,052,734 A | 4/2000 | Ito et al. |
| 6,058,289 A | 5/2000 | Gardner et al. |
| 6,061,793 A | 5/2000 | Tewfik et al. |
| 6,072,984 A | 6/2000 | Barringer |
| 6,104,295 A | 8/2000 | Gaisser et al. |
| 6,184,918 B1 | 2/2001 | Goldschmidt Iki et al. |
| 6,208,735 B1 | 3/2001 | Cox et al. |
| 6,259,355 B1 | 7/2001 | Chaco et al. |
| 6,275,166 B1 | 8/2001 | Del Castillo et al. |
| 6,286,036 B1 | 9/2001 | Rhoads |
| 6,286,140 B1 | 9/2001 | Ivanyi |
| 6,300,880 B1 | 10/2001 | Sitnik |

(56) References Cited

U.S. PATENT DOCUMENTS

| | | |
|---|---|---|
| 6,308,045 B1 | 10/2001 | Wright et al. |
| RE37,531 E | 1/2002 | Chaco et al. |
| 6,359,557 B2 | 3/2002 | Bilder |
| 6,363,159 B1 | 3/2002 | Rhoads |
| 6,381,577 B1 | 4/2002 | Brown |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,430,498 B1 | 8/2002 | Maruyama et al. |
| 6,433,689 B1 | 8/2002 | Hovind et al. |
| 6,434,614 B1 | 8/2002 | Blumenau |
| 6,460,079 B1 | 10/2002 | Blumenau |
| 6,487,564 B1 | 11/2002 | Asai et al. |
| 6,487,719 B1 | 11/2002 | Itoh et al. |
| 6,505,160 B1 | 1/2003 | Levy et al. |
| 6,512,836 B1 | 1/2003 | Xie et al. |
| 6,523,175 B1 | 2/2003 | Chan |
| 6,529,952 B1 | 3/2003 | Blumenau |
| 6,539,095 B1 | 3/2003 | Rhoads |
| 6,546,043 B1 | 4/2003 | Kong |
| 6,546,556 B1 | 4/2003 | Kataoka et al. |
| 6,577,238 B1 | 6/2003 | Whitesmith et al. |
| 6,606,744 B1 | 8/2003 | Mikurak |
| 6,642,966 B1 | 11/2003 | Limaye |
| 6,650,322 B2 | 11/2003 | Dai et al. |
| 6,651,253 B2 | 11/2003 | Dudkiewicz et al. |
| 6,654,480 B2 | 11/2003 | Rhoads |
| 6,662,137 B2 | 12/2003 | Squibbs |
| 6,671,732 B1 | 12/2003 | Weiner |
| 6,671,818 B1 | 12/2003 | Mikurak |
| 6,675,383 B1 | 1/2004 | Wheeler et al. |
| 6,683,966 B1 | 1/2004 | Tian et al. |
| 6,714,683 B1 | 3/2004 | Tian et al. |
| 6,766,523 B2 | 7/2004 | Kerley |
| 6,813,475 B1 | 11/2004 | Worthy |
| 6,829,368 B2 | 12/2004 | Meyer et al. |
| 6,839,539 B2 | 1/2005 | Durrant et al. |
| 6,940,403 B2 | 9/2005 | Kail, IV |
| 6,941,275 B1 | 9/2005 | Swierczek |
| 6,968,564 B1 | 11/2005 | Srinivasan |
| 6,970,886 B1 | 11/2005 | Conwell et al. |
| 7,003,731 B1 | 2/2006 | Rhoads et al. |
| 7,031,733 B2 | 4/2006 | Alminana et al. |
| 7,032,178 B1 | 4/2006 | McKnight et al. |
| 7,050,603 B2 | 5/2006 | Rhoads et al. |
| 7,055,165 B2 | 5/2006 | Connelly |
| 7,058,697 B2 | 6/2006 | Rhoads |
| 7,080,061 B2 | 7/2006 | Kabala |
| 7,086,075 B2 | 8/2006 | Swix et al. |
| 7,095,871 B2 | 8/2006 | Jones et al. |
| 7,107,009 B2 | 9/2006 | Sairanen et al. |
| 7,117,008 B2 | 10/2006 | Bajikar |
| 7,124,101 B1 | 10/2006 | Mikurak |
| 7,130,807 B1 | 10/2006 | Mikurak |
| 7,155,159 B1 | 12/2006 | Weinblatt et al. |
| 7,171,018 B2 | 1/2007 | Rhoads et al. |
| 7,174,293 B2 | 2/2007 | Kenyon et al. |
| 7,185,201 B2 | 2/2007 | Rhoads et al. |
| 7,194,752 B1 | 3/2007 | Kenyon et al. |
| 7,197,156 B1 | 3/2007 | Levy |
| 7,221,405 B2 | 5/2007 | Basson et al. |
| 7,222,071 B2 | 5/2007 | Neuhauser et al. |
| 7,227,972 B2 | 6/2007 | Brundage et al. |
| 7,254,249 B2 | 8/2007 | Rhoads et al. |
| 7,289,643 B2 | 10/2007 | Brunk et al. |
| 7,346,512 B2 | 3/2008 | Li-Chun Wang et al. |
| 7,356,700 B2 | 4/2008 | Noridomi et al. |
| 7,421,723 B2 | 9/2008 | Harkness et al. |
| 7,460,827 B2 | 12/2008 | Schuster et al. |
| 7,587,732 B2 | 9/2009 | Wright et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,647,604 B2 | 1/2010 | Ramaswamy |
| 7,650,616 B2 | 1/2010 | Lee |
| 7,712,114 B2 | 5/2010 | Ramaswamy |
| 7,783,282 B2 | 8/2010 | Wendling |
| 7,783,889 B2 | 8/2010 | Srinivasan |
| 7,788,684 B2 | 8/2010 | Peuovic et al. |
| 7,793,316 B2 | 9/2010 | Mears et al. |
| 7,827,312 B2 | 11/2010 | Ramaswamy et al. |
| 7,941,525 B1 | 5/2011 | Yavilevich |
| 7,996,431 B2 | 8/2011 | Coffman et al. |
| 8,020,179 B2 | 9/2011 | Mears et al. |
| 8,125,455 B2 | 2/2012 | Land et al. |
| 8,296,087 B2 | 10/2012 | Kalinin et al. |
| 8,327,396 B2 | 12/2012 | Ramaswamy et al. |
| 8,370,489 B2 | 2/2013 | Mazumdar et al. |
| 8,429,516 B1 | 4/2013 | Riggs et al. |
| 8,429,683 B2 | 4/2013 | Dasgupta |
| 8,510,375 B2 | 8/2013 | Bouazizi |
| 8,539,519 B2 | 9/2013 | Mears et al. |
| 8,713,168 B2 | 4/2014 | Heffernan et al. |
| 8,745,647 B1 | 6/2014 | Shin et al. |
| 9,282,366 B2 | 3/2016 | Nielsen |
| 9,699,499 B2 | 7/2017 | Besehanic |
| 2001/0031066 A1 | 10/2001 | Meyer et al. |
| 2001/0044899 A1 | 11/2001 | Levy |
| 2002/0016969 A1 | 2/2002 | Kimble |
| 2002/0027682 A1 | 3/2002 | Iwasaki et al. |
| 2002/0059094 A1 | 5/2002 | Hosea et al. |
| 2002/0059218 A1 | 5/2002 | August et al. |
| 2002/0068556 A1 | 6/2002 | Brown |
| 2002/0083060 A1 | 6/2002 | Wang et al. |
| 2002/0124246 A1 | 9/2002 | Kaminsky et al. |
| 2002/0144259 A1 | 10/2002 | Gutta et al. |
| 2002/0150247 A1 | 10/2002 | Linnartz et al. |
| 2002/0152090 A1 | 10/2002 | Kobayashi et al. |
| 2002/0152459 A1 | 10/2002 | Bates et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0197063 A1 | 12/2002 | Cho |
| 2003/0005430 A1 | 1/2003 | Kolessar |
| 2003/0021441 A1 | 1/2003 | Levy et al. |
| 2003/0039465 A1 | 2/2003 | Bjorgan et al. |
| 2003/0046385 A1 | 3/2003 | Vincent |
| 2003/0046685 A1 | 3/2003 | Srinivasan et al. |
| 2003/0070182 A1 | 4/2003 | Pierre et al. |
| 2003/0079131 A1 | 4/2003 | Reefman |
| 2003/0088674 A1 | 5/2003 | Ullman et al. |
| 2003/0097302 A1 | 5/2003 | Overhultz et al. |
| 2003/0108200 A1 | 6/2003 | Sako |
| 2003/0121041 A1 | 6/2003 | Mineyama |
| 2003/0172376 A1 | 9/2003 | Coffin, III |
| 2003/0177488 A1 | 9/2003 | Smith et al. |
| 2004/0009763 A1 | 1/2004 | Stone et al. |
| 2004/0019463 A1 | 1/2004 | Kolessar et al. |
| 2004/0025174 A1 | 2/2004 | Cerrato |
| 2004/0027271 A1 | 2/2004 | Schuster et al. |
| 2004/0041703 A1 | 3/2004 | Bergman et al. |
| 2004/0064319 A1 | 4/2004 | Neuhauser et al. |
| 2004/0064351 A1 | 4/2004 | Mikurak |
| 2004/0073916 A1 | 4/2004 | Peuovic et al. |
| 2004/0122679 A1 | 6/2004 | Neuhauser et al. |
| 2004/0237096 A1 | 11/2004 | Cain et al. |
| 2004/0250281 A1 | 12/2004 | Feininger et al. |
| 2005/0028189 A1 | 2/2005 | Heine et al. |
| 2005/0033758 A1 | 2/2005 | Baxter |
| 2005/0034147 A1 | 2/2005 | Best, Jr. et al. |
| 2005/0054285 A1 | 3/2005 | Mears et al. |
| 2005/0058319 A1 | 3/2005 | Rhoads et al. |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0177738 A1 | 8/2005 | Van Der Veen et al. |
| 2005/0207592 A1 | 9/2005 | Sporer et al. |
| 2005/0216509 A1 | 9/2005 | Kolessar et al. |
| 2006/0031297 A1 | 2/2006 | Zuidema |
| 2006/0059277 A1 | 3/2006 | Zito et al. |
| 2006/0107195 A1 | 5/2006 | Ramaswamy et al. |
| 2006/0178918 A1 | 8/2006 | Mikurak |
| 2006/0195886 A1 | 8/2006 | Ashley |

(56) References Cited

U.S. PATENT DOCUMENTS

| | | |
|---|---|---|
| 2006/0242325 A1 | 10/2006 | Ramaswamy et al. |
| 2007/0011040 A1 | 1/2007 | Wright et al. |
| 2007/0055987 A1 | 3/2007 | Lu et al. |
| 2007/0074020 A1 | 3/2007 | Nishimura |
| 2007/0112837 A1 | 5/2007 | Houh et al. |
| 2007/0127717 A1 | 6/2007 | Herre et al. |
| 2007/0129952 A1 | 6/2007 | Kenyon et al. |
| 2007/0136777 A1 | 6/2007 | Hasek et al. |
| 2007/0157262 A1 | 7/2007 | Ramaswamy et al. |
| 2007/0162927 A1 | 7/2007 | Ramaswamy et al. |
| 2007/0177626 A1 | 8/2007 | Kotelba |
| 2007/0186228 A1 | 8/2007 | Ramaswamy et al. |
| 2007/0186231 A1 | 8/2007 | Haeuser et al. |
| 2007/0201835 A1 | 8/2007 | Rhoads |
| 2007/0226760 A1 | 9/2007 | Neuhauser et al. |
| 2007/0274523 A1 | 11/2007 | Rhoads |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0066099 A1 | 3/2008 | Brodersen et al. |
| 2008/0082510 A1 | 4/2008 | Wang et al. |
| 2008/0082922 A1 | 4/2008 | Biniak et al. |
| 2008/0086533 A1 | 4/2008 | Neuhauser et al. |
| 2008/0091087 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0126420 A1 | 5/2008 | Wright et al. |
| 2008/0133223 A1 | 6/2008 | Son et al. |
| 2008/0139182 A1 | 6/2008 | Levy et al. |
| 2008/0140573 A1 | 6/2008 | Levy et al. |
| 2008/0184132 A1 | 7/2008 | Zato |
| 2008/0204273 A1 | 8/2008 | Crystal et al. |
| 2008/0219496 A1 | 9/2008 | Tewfik et al. |
| 2008/0235348 A1 | 9/2008 | Dasgupta |
| 2008/0240490 A1 | 10/2008 | Finkelstein et al. |
| 2008/0249961 A1 | 10/2008 | Harkness et al. |
| 2008/0310629 A1 | 12/2008 | Van Der Veen et al. |
| 2009/0037575 A1 | 2/2009 | Crystal et al. |
| 2009/0044246 A1 | 2/2009 | Sheehan et al. |
| 2009/0070797 A1 | 3/2009 | Ramaswamy et al. |
| 2009/0077597 A1 | 3/2009 | Lee |
| 2009/0183210 A1 | 7/2009 | Andrade |
| 2009/0254943 A1 | 10/2009 | Maynard et al. |
| 2009/0259325 A1 | 10/2009 | Topchy et al. |
| 2009/0290852 A1 | 11/2009 | Wright |
| 2009/0307061 A1 | 12/2009 | Monighetti et al. |
| 2009/0307084 A1 | 12/2009 | Monighetti et al. |
| 2010/0094897 A1 | 4/2010 | Sumrall et al. |
| 2010/0125544 A1* | 5/2010 | Lee .................. H04N 21/6582 706/54 |
| 2010/0131972 A1 | 5/2010 | Byun |
| 2010/0153189 A1* | 6/2010 | Dudley ............ H04N 21/44222 725/13 |
| 2010/0226526 A1 | 9/2010 | Modro et al. |
| 2010/0262986 A1 | 10/2010 | Adimatyam et al. |
| 2010/0268540 A1 | 10/2010 | Arshi et al. |
| 2010/0268573 A1 | 10/2010 | Jain et al. |
| 2010/0280641 A1 | 11/2010 | Harkness et al. |
| 2010/0299689 A1 | 11/2010 | Mears et al. |
| 2010/0306257 A1 | 12/2010 | Levy |
| 2011/0016231 A1 | 1/2011 | Ramaswamy et al. |
| 2011/0075990 A1 | 3/2011 | Eyer |
| 2011/0085526 A1 | 4/2011 | Joseph et al. |
| 2011/0088052 A1 | 4/2011 | Ramaswamy et al. |
| 2011/0173200 A1 | 7/2011 | Yang et al. |
| 2011/0289523 A1 | 11/2011 | Mears et al. |
| 2012/0110027 A1 | 5/2012 | Falcon |
| 2012/0122418 A1 | 5/2012 | Hicks, III |
| 2012/0151079 A1 | 6/2012 | Besehanic et al. |
| 2012/0239809 A1 | 9/2012 | Mazumdar et al. |
| 2012/0265735 A1 | 10/2012 | McMillan et al. |
| 2012/0272142 A1 | 10/2012 | McCollum et al. |
| 2013/0007298 A1 | 1/2013 | Ramaswamy et al. |
| 2013/0007794 A1 | 1/2013 | Besehanic et al. |
| 2013/0097285 A1 | 4/2013 | van Zwol et al. |
| 2013/0174190 A1 | 7/2013 | Ramaswamy et al. |
| 2013/0205347 A1 | 8/2013 | Xu et al. |
| 2013/0226962 A1 | 8/2013 | Riggs et al. |
| 2013/0254634 A1 | 9/2013 | Luby et al. |
| 2013/0268623 A1 | 10/2013 | Besehanic et al. |
| 2013/0268630 A1 | 10/2013 | Besehanic et al. |
| 2013/0276035 A1 | 10/2013 | Walker et al. |
| 2013/0290508 A1 | 10/2013 | Besehanic et al. |
| 2013/0291001 A1 | 10/2013 | Besehanic et al. |
| 2013/0311776 A1 | 11/2013 | Besehanic |
| 2013/0311780 A1 | 11/2013 | Besehanic |
| 2013/0325869 A1 | 12/2013 | Reiley et al. |
| 2013/0332604 A1 | 12/2013 | Seth et al. |
| 2014/0020007 A1 | 1/2014 | Mears et al. |
| 2014/0032454 A1 | 1/2014 | Zhang et al. |
| 2014/0047467 A1 | 2/2014 | Arling et al. |
| 2014/0047468 A1 | 2/2014 | Nielsen |
| 2014/0053202 A1 | 2/2014 | Selim |
| 2014/0123179 A1 | 5/2014 | Wang |
| 2014/0214772 A1 | 7/2014 | Kadayam |
| 2014/0229629 A1 | 8/2014 | Besehanic |
| 2014/0229970 A1 | 8/2014 | Besehanic |
| 2014/0237498 A1* | 8/2014 | Ivins ................. H04N 21/44222 725/14 |
| 2014/0244828 A1 | 8/2014 | Besehanic |
| 2015/0106505 A1 | 4/2015 | Ramaswamy et al. |
| 2015/0319490 A1 | 11/2015 | Besehanic |
| 2016/0094601 A1 | 3/2016 | Besehanic |
| 2017/0302996 A1 | 10/2017 | Besehanic |
| 2019/0208269 A1 | 7/2019 | Besehanic |

FOREIGN PATENT DOCUMENTS

| | | |
|---|---|---|
| CA | 2483104 | 11/2003 |
| CN | 1647160 | 7/2005 |
| EP | 0231427 | 8/1987 |
| EP | 0769749 | 4/1997 |
| EP | 1349370 | 10/2003 |
| EP | 1406403 | 4/2004 |
| EP | 1307833 | 6/2006 |
| EP | 1504445 | 8/2008 |
| GB | 2176639 | 12/1986 |
| JP | 2002247610 | 8/2002 |
| JP | 2008263544 | 10/2008 |
| KR | 20020037980 | 5/2002 |
| WO | 9512278 | 5/1995 |
| WO | 9527349 | 10/1995 |
| WO | 96027840 | 9/1996 |
| WO | 97002672 | 1/1997 |
| WO | 0004662 | 1/2000 |
| WO | 0119088 | 3/2001 |
| WO | 0211123 | 2/2002 |
| WO | 0217591 | 2/2002 |
| WO | 0227600 | 4/2002 |
| WO | 03009277 | 1/2003 |
| WO | 03091990 | 11/2003 |
| WO | 03094499 | 11/2003 |
| WO | 03096337 | 11/2003 |
| WO | 2004010352 | 1/2004 |
| WO | 2004040416 | 5/2004 |
| WO | 2004040475 | 5/2004 |
| WO | 2004061699 | 7/2004 |
| WO | 2005041109 | 5/2005 |
| WO | 2005064885 | 7/2005 |
| WO | 2005101243 | 10/2005 |
| WO | 2006099612 | 9/2006 |
| WO | 2007056532 | 5/2007 |
| WO | 2007073484 | 6/2007 |
| WO | 2008042953 | 4/2008 |
| WO | 2008044664 | 4/2008 |
| WO | 2008045950 | 4/2008 |
| WO | 2009064561 | 5/2009 |
| WO | 2012177866 | 12/2012 |

(56) References Cited

FOREIGN PATENT DOCUMENTS

| WO | 2012177870 | 12/2012 |
|---|---|---|
| WO | 2012177872 | 12/2012 |
| WO | 2012177874 | 12/2012 |

OTHER PUBLICATIONS

"Video: timed text tracks," Windows Internet Explorer, Microsoft, 2012, [retrieved from Internet at http://msdn.microsoft.com/en-us/library/ie/hh673566(v=vs.85).aspx],6 pages.
Albanesius, Chloe, "Facebook Issues Fix for Several Tracking Cookies," internet article, http://www.pcmag.eom/article2/0,2817,2393750,00.asp, Sep. 28, 2011, 2 pages.
Anderson, "Google to compete with Nielsen for TV-ratings info?," Ars Technica, Jun. 19, 2006, 2 pages.
Apple Inc. "HTTP Live Streaming Overview," Apr. 1, 2011, 36 pages.
Apple Inc. "Timed Metadata for HTTP Live Streaming," Apr. 28, 2011, 12 pages.
Claburn, "Google Researchers Propose TV Monitoring," Information Week, Jun. 7, 2006 3 pages.
Coffey, "Internet Audience Measurement: A Practitioner's View," Journal of Interactive Advertising, vol. 1, No. 2, Spring 2001, 8 pages.
Corment et al., "C Track: assignment 7," published Sep. 14, 2004, 6 pages.
Cubrilovic, Nik, "Logging out of Facebook is not enough," internet article, www.nikcub.appspot.com, Sep. 25, 2011, 3 pages.
European Patent Office, "Annex to the European Search Report," issued in connection with European Patent Application No. EP 03 81 5891, dated Feb. 11, 2009, 1 page.
European Patent Office, "Decision to refuse a European Patent Application," issued in connection with European Patent Application No. EP11010170.6, May 26, 2014, 47 pages.
European Patent Office, "Communication pursuant to Article 94(3) EPC," issued in connection with European Patent Application No. EP11010170.6, dated Jan. 10, 2013, 16 pages.
European Patent Office, "Communication regarding supplemental European Search Report," issued in connection with European Patent Application No. EP 03 81 5891, dated Feb. 27, 2009, 1 page.
Evain, "TV-Anytime Metadata—A Preliminary Specification on Schedule!" EBU Technical Review, Sep. 2000 [http://www.ebu.ch/en/technical/trev/trev_284-contents.html, retrieved on Jul. 20, 2006] 14 pages.
Fliptop, "Fliptop Person API Documentation," https://developerfliptop.com/documentation, retrieved on May 7, 2013, 6 pages.
Fliptop, "What is Fliptop?," www.fliptop.com/about_us, retrieved on May 7, 2013, 1 page.
Heussner, "Sound-Triggered Smart Phone Ads Seek You Out,"Adweek.com, http://www.adweek.com/news/advertising-branding/sound-triggered-smartphone-ads-seek-you-out-136901, Dec. 7, 2011, 1 page.
Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006], 24 pages.
Indian Patent Office, Communication indicating grant of Indian Patent No. 225893, dated Jan. 27, 2009, 3 pages.
Indian Patent Office, English translation of Office action, issued in connection with Indian Patent Application No. 1833/CHENP/2005 (now Indian Patent No. 225893), dated Dec. 12, 2007, 2 pages.
Kane, "Entrepreneur Plans On-Demand Videogame Service," The Wall Street Journal, Mar. 24, 2009, 2 pages.
Launder, "Media Journal: Nielsen to Test Online-TV Viewing Tool," The Wall Street Journal, Apr. 30, 2013, 2 pages.
Laven, "EBU Technical Review (Editorial)," No. 284, Sep. 2000 [http://www.ebu.ch/en/technical/trev/trev_284-contents.html, retrieved on Jul. 20, 2006], 3 pages.
Mulder, "The Integration of Metadata From Production to Consumer," EBU Technical Review, Sep. 2000 [http://www.ebu.ch/en/technical/trev/trev_284-contents.html, retrieved on Jul. 20, 2006], 5 pages.
PCT, "International Preliminary Examination Report," issued in connection with international application No. PCT/US03/04030, dated Apr. 22, 2004, 9 pages.
PCT, "International Search Report," issued in connection with international apphcation No. PCT/US03/04030, dated Aug. 19, 2003, 4 pages.
PCT, "Written Opinion," issued in connection with Application No. PCT/US03/04030, Dated Dec. 12, 2003, 8 pages.
Protalinski, Emil, "Facebook denies cookie tracking allegations," internet article, http://www.zdnet.com/blog/facebook/facebook-denies-cookie-tracking-allegations/4044, Sep. 25, 2011, 2 pages.
Protalinski, Emil, "Facebook fixes cookie behavior after logging out," internet article, http://www.zdnet.com/blog/facebook/facebook-fixes-cookie-behavior-after-logging-out/4120, Sep. 27, 2011, 2 pages.
Protalinski, Emil, "US congressmen ask FTC to investigate Facebook cookies," internet article, http://www.zdnet.com/blog/facebook/US-congressmen-ask-ftc-to-investigate-facebook-cookies/4218, Sep. 28, 2011, 2 pages.
R. Pantos, Ed., & W. May, Apple Inc. "HTTP Live Streaming: draft-pantos-http-live-streaming-07," Sep. 2011, 33 pages.
Radio Ink, "Arbitron & Scarborough Unveil New Mall Shopper Audience Measurment," May 7, 2008, 1 page.
Rapleaf, "Fast. Simple. Secure," www.rapleaf.com/why-rapleaft, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," Wall Street Journal, Apr. 30, 2013, 3 pages.
Shazam, "Shazam and VidZone Digital Media announce UK1s first fixed price mobile download service for music videos," http://www.shazam.com/music/web/newsdetail.html?nid=NEWS136, Feb. 11, 2008, 1 page.
Shazam, "Shazam launches new music application for Facebook fans," http://www.shazam.com/music/web/newsdetail.html?nid-NEWS135, Feb. 18, 2008, 1 page.
Shazam, "Shazam turns up the volume on mobile music," http://www.shazam.com/music/web/newsdetail.html?nid-NEWS137, Nov. 28, 2007, 1 page.
Shazam, Company summary outline and list of products, 1 page.
Sullivan, "Google Cozies Up To SMBs For Digital Content," MediaPost News, Mar. 18, 2009, 2 pages.
Taiwanese Patent Office, English translation of Office commumcation, issued in connection with Taiwanese Patent Application No. 92107979, dated Jul. 26, 2009, 1 page.
Taiwanese Patent Office, English translation of Office commumcation, issued in connection with Taiwanese Patent Application No. 92107979, dated Jul. 19, 2007, 3 pages.
Taiwanese Patent Office, Translation of examiners opinion, issued in connection with Taiwanese Patent Application No. 92107979, Oct. 30, 2007, 1 page.
Taiwanese Patent Office, Translation of examiners opinion, issued in connection with Taiwanese Patent Application No. 92107979, Oct. 31, 2007, 2 pages.
Van Beek et al., "Metadata-Driven Multimedia Access," IEEE Signal Processing Magazine, vol. 20, No. 2, Institute of Electric and Electronic Engineers, Inc., New York, New York, USA, Mar. 2003, 13 pages.
Vega, Tanzina, "Nielsen Introduces New Ad Measurement Product," The New York Times, Sep. 27, 2010, 7 pages.
Vetro et al., "Video Transcoding Architectures and Techniques: An Overview," IEEE Signal Processing Magazine, vol. 20, No. 2, Institute of Electric and Electronic Engineers, Inc., New York, New York, USA, Mar. 2003, 12 pages.
Vranica, "Nielsen Testing a New Web-Ad Metric," The Wall Street Journal, Sep. 23, 2010, 2 pages.
Wactlar et al., "Digital Video Archives: Managing Through Metadata" Building a National Strategy for Digital Preservation: Issues in

(56) References Cited

OTHER PUBLICATIONS

Digital Media Archiving, http://www.informedia.cs.cmu.edu/documents/Wactlar-CLIR-final.pdf, Apr. 2002, 14 pages.

Wang, "An Industrial-Strength Audio Search Algorithm," Shazam Entertainment, Ltd., in Proceedings of the Fourth International Conference on Music Information Retrieval, Baltimore, Oct. 26-30, 2003, 7 pages.

Winkelman, Erik, "Timed Text Tracks and TV Services," Aug. 15, 2011, 5 pages.

United States Patent and Trademark Office, "Advisory Action," issued in connection with U.S. Appl. No. 10/867,190, dated Feb. 24, 2009, 3 pages.

United States Patent and Trademark Office, "Final Office Action," issued in connection with U.S. Appl. No. 10/867,190, dated Nov. 4, 2008, 24 pages.

United States Patent and Trademark Office, "Non-final Office Action," issued in connection with U.S. Appl. No. 10/867,190, dated Feb. 22, 2010, 19 pages.

United States Patent and Trademark Office, "Non-final Office Action," issued in connection with U.S. Appl. No. 10/867,190, dated Jul. 28, 2009, 18 pages.

United States Patent and Trademark Office, "Non-final Office Action," issued in connection with U.S. Appl. No. 10/867,190, dated May 8, 2008, 22 pages.

United States Patent and Trademark Office, "Non-final Office Action," issued in connection with U.S. Appl. No. 13/194,657, dated Oct. 23, 2012, 13 pages.

United States Patent and Trademark Office, "Non-Final Office Action," issued in connection with U.S. Appl. No. 12/847,805, dated Jan. 13, 2011, 26 pages.

United States Patent and Trademark Office, "Non-Final Office Action," issued in connection with U.S. Appl. No. 13/584,352 dated May 16, 2013, 20 pages.

United States Patent and Trademark Office, "Notice of Allowance," issued in connection with U.S. Appl. No. 10/867,190, dated Jul. 21, 2010, 11 pages.

United States Patent and Trademark Office, "Notice of Allowance," issued in connection with U.S. Appl. No. 13/194,657, dated May 16, 2013, 8 pages.

United States Patent and Trademark Office, "Notice of Allowance," issued in connection with U.S. Appl. No. 12/847,805, dated May 31, 2011, 17 pages.

United States Patent and Trademark Office, "Final Office Action," issued in connection with U.S. Appl. No. 13/584,352 dated Sep. 24, 2013, 10 pages.

United States Patent and Trademark Office, "Non-Final Office Action," issued in connection with U.S. Appl. No. 13/584,352, dated Aug. 7, 2014, 12 pages.

United States Patent and Trademark Office, "Final Office Action," issued in connection with U.S. Appl. No. 13/584,352, dated Dec. 15, 2014, 12 pages.

United States Patent and Trademark Office, "Final Office Action," issued in connection with U.S. Appl. No. 13/584,352, dated Mar. 30, 2015, 8 pages.

United States Patent and Trademark Office, "Notice of Allowance," issued in connection with U.S. Appl. No. 13/584,352, dated Jul. 9, 2015, 9 pages.

United States Patent and Trademark Office, "Notice of Allowance," issued in connection with U.S. Appl. No. 13/584,352, dated Nov. 3, 2015, 7 pages.

United States Patent and Trademark Office, "Non-Final Office Action," issued in connection with U.S. Appl. No. 14/027,964, dated Aug. 12, 2014, 48 pages.

United States Patent and Trademark Office, "Non-Final Office Action," issued in connection with U.S. Appl. No. 14/266,118, dated Oct. 6, 2016, 20 pages.

United States Patent and Trademark Office, "Final Office Action," issued in connection with U.S. Appl. No. 14/266,118, dated Feb. 26, 2016, 22 pages.

United States Patent and Trademark Office, "Non-Final Office Action," issued in connection with U.S. Appl. No. 14/266,118, dated Aug. 8, 2015, 18 pages.

United States Patent and Trademark Office, "Notice of Allowance," issued in connection with U.S. Appl. No. 14/266,118, dated Mar. 1, 2017, 5 pages.

United States Patent and Trademark Office, "Non-Final Office Action," issued in connection with U.S. Appl. No. 15/638,127, dated Mar. 30, 2018, 17 pages.

United States Patent and Trademark Office, "Notice of Allowance," issued in connection with U.S. Appl. No. 15/638,127, dated Oct. 23, 2018, 8 pages.

United States Patent and Trademark Office, "Non-Final Office Action," issued in connection with U.S. Appl. No. 16/296,632, dated Jul. 30, 2019, 18 pages.

* cited by examiner

METHODS AND APPARATUS TO MEASURE EXPOSURE TO STREAMING MEDIA

RELATED APPLICATIONS

This patent arises from a continuation of U.S. patent application Ser. No. 16/296,632, filed Mar. 8, 2019, and titled "Methods and Apparatus to Measure Exposure to Streaming Media," which arises from a continuation of and claims priority to U.S. patent application Ser. No. 15/638,127 (now U.S. Pat. No. 10,231,013), filed Jun. 29, 2017, and titled "Methods and Apparatus to Measure Exposure to Streaming Media," which arises from a continuation of and claims priority to U.S. patent application Ser. No. 14/266,118 (now U.S. Pat. No. 9,699,499), filed Apr. 30, 2014, and titled "Methods and Apparatus to Measure Exposure to Streaming Media." U.S. patent application Ser. No. 16/296,632, U.S. patent application Ser. No. 15/638,127, and U.S. patent application Ser. No. 14/266,118 are hereby incorporated by reference in their entirety.

FIELD OF THE DISCLOSURE

This disclosure relates generally to measuring media exposure, and, more particularly, to methods and apparatus to measure exposure to streaming media.

BACKGROUND

Internet access to media has become widespread. Media is now frequently streamed to consumers via streaming services such as, Netflix™ Hulu™, and others. Streaming enables media to be delivered to and presented by a wide variety of media presentation devices, such as smart TVs, desktop computers, laptop computers, tablet computers, personal digital assistants, smartphones, gaming consoles, etc. A significant portion of media (e.g., content and/or advertisements) is presented via streaming to such devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
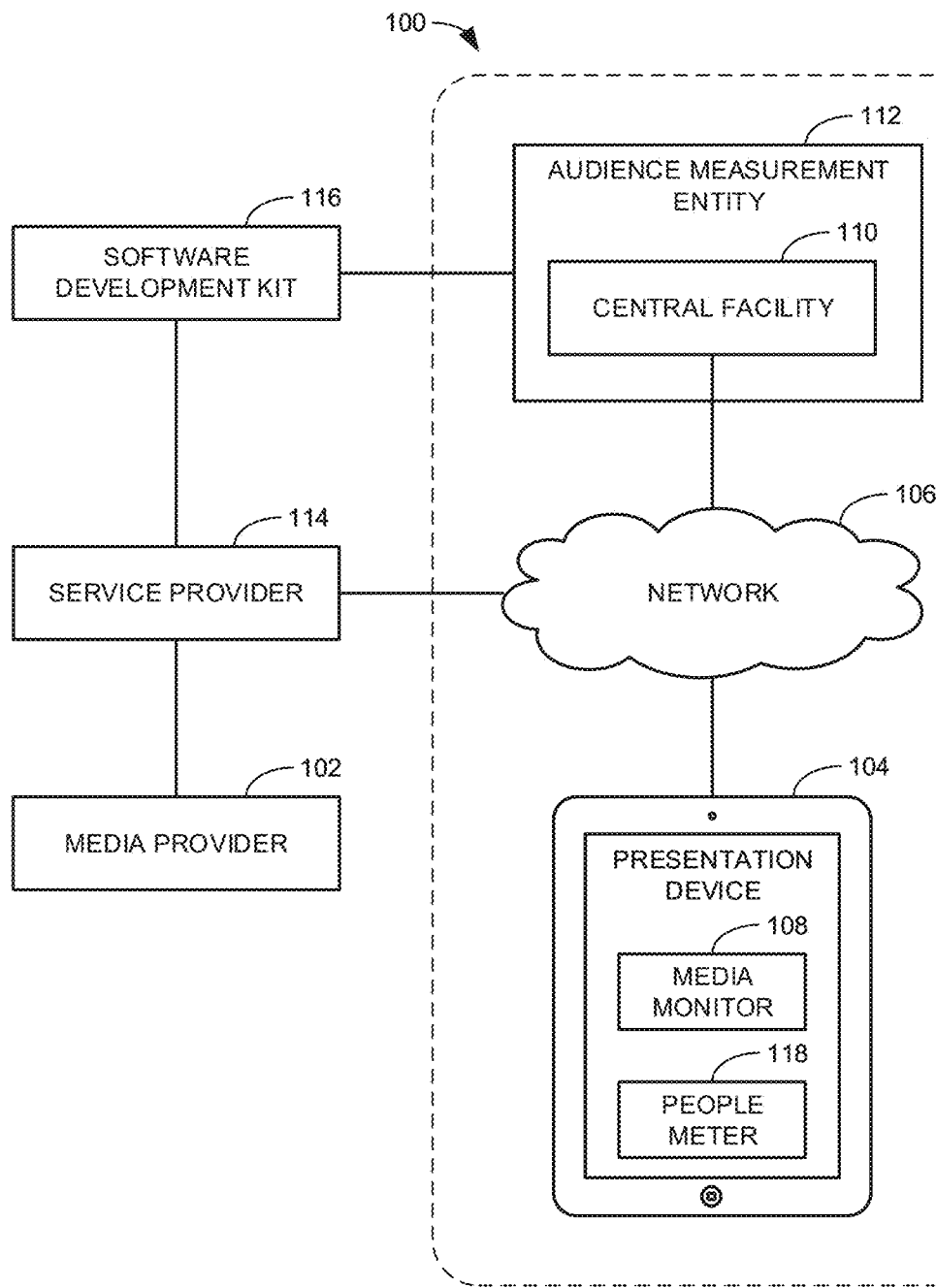
FIG. 1 is a block diagram of an example system constructed in accordance with the teachings of this disclosure for measuring exposure to streaming media.

The use of media presentation devices (e.g., smartphones, tablets, MP3 players, personal computers, etc.) to present streaming media available via the Internet has increased in recent years. As different types of media applications (e.g., a Netflix™ application, a Hulu™ application, a Pandora™ application, etc.) for such media devices have been created, the popularity of streaming media has increased. In some instances, service providers enable the playing of media in an Internet browser and/or via a specific application ("app") running on a media presentation device. In this manner, some households have eliminated traditional sources of media (e.g., satellite television, cable television) in favor of such streaming devices. In view of the increasing popularity of accessing media in this manner, understanding how users interact with the streaming media (e.g., such as by understanding what media is presented, how the media is presented, what demographic segments are using this technology, etc.) provides valuable information to service providers, advertisers, content providers, manufacturers, and/or other entities.

Example methods, apparatus, systems, and articles of manufacture disclosed herein may be used to measure exposure to streaming media. Some such example methods, apparatus, and/or articles of manufacture measure such exposure based on media metadata. Some such examples correlate media exposure with user demographics, and/or media device types. Some examples disclosed herein are used to monitor streaming media transmissions received at media presentation devices adapted to receive streaming media such as a DVD player, a Smart TV, an Apple TV®, a Roku™ media player, a Boxee™ media player, a Sony PlayStation™, a Microsoft® Xbox®, an Apple iPad®, and/or any other device capable of playing streaming and/or Internet based (e.g., IP protocol network band) media. Example monitoring processes disclosed herein collect metadata from network communications associated with streaming media presented via such presentation devices and associate the metadata with demographic information of users of the media devices. In some examples, the users are people (e.g., potential audience members) that have agreed to participate as panelists in a research study. In some examples, the panelists correspond to a statistically selected subset of all potential audience members that is representative of the whole population of interest. In some such panel-based monitoring systems, the panelists agree to provide detailed demographic information about themselves. In this manner, detailed exposure metrics are generated based on collected metadata and associated user demographics, which can then be statistically extrapolated to an entire population of interest (e.g., a local market, a national market, a demographic segment, etc.).

Rather than relying on consenting panelists volunteering for a specific research study, some example monitoring processes disclosed herein employ a census level methodology and/or collect metadata associated with streaming media presented on presentation devices from most of or even the entire audience member population (e.g., from all users where the corresponding metadata is able to be collected). Although audience members in such census level approaches typically have not specifically agreed to being monitored as part of a particular research study, in some examples, the users consent to such metadata collection based on the terms of use of the browser, application, or other software through which the media is streamed and which implements functionality associated with media monitoring as disclosed herein.

In some examples, the audience members in a census-wide research study may not directly share any demographic information that can be tied to their media exposure. However, in some examples, demographic information is obtainable indirectly. For instance, in some examples, along with the collected metadata, an audience measurement entity (e.g., the Nielsen Company (US) LLC) may collect and/or trigger forwarding of third party (e.g., cookies not associated with the audience measurement entity) web cookies stored on the presentation devices of audience members. In some examples, the cookie is provided to a third party data provider associated with the cookie (e.g., Facebook™, Yahoo™, Experian™, etc.) that does have access to demographic information associated with the users (or presentation devices) corresponding to the cookies. For example, cookies collected from all monitored audience members may be sent to a social network provider, such as Facebook™, which stores demographic information associated with its users. The social network provider (e.g., Facebook™) may identify which of its users corresponds to the cookies provided by the audience measurement entity to then identify the users' demographic information. To maintain privacy, the social network provider (e.g., Facebook™) may aggregate and anonymize the demographic information based on the cookies collected by the audience measurement entity. The social network or other database proprietors (e.g., Experian) may provide the aggregated demographic data to the audience measurement entity for association with the media exposure metrics determined from the collected metadata. In this manner, audience measurement can be performed on entire populations (at least among all users where the corresponding metadata can be collected) without the need for statistical extrapolation as in the panel-based examples. Example implementations of collecting and aggregating demographic information via third party database proprietors are disclosed in U.S. patent application Ser. No. 13/513,148, filed on Sep. 21, 2011, now U.S. Pat. No. 8,370,489; U.S. patent application Ser. No. 13/915,381, filed on Jun. 11, 2013; and U.S. patent application Ser. No. 14/025,575, filed on Sep. 12, 2013, all of which are hereby incorporated by reference herein in their entireties.

In a streaming media distribution network, streaming media is received at a service provider from a media provider such as, for example, a satellite provider, a cable provider, a physical media provider (e.g., a Digital Versatile Disk (DVD)-by-mail service, etc.). The media is intended to be streamed from the service provider to one or more presentation devices for presentation thereon in response to the request(s) for the same. In some examples, the media device requests media (e.g., content and/or advertising) from a service provider via a network (e.g., the Internet). In some examples, the request for media is a HyperText Transfer Protocol (HTTP) request, a Session Initiation Protocol (SIP) message, a domain name service (DNS) query, a file transfer protocol (FTP) request, and/or any other type of request for media. In some examples, the media is provided to the media devices as a transport stream. In some examples, metadata to be collected for purposes of media monitoring is extracted from the transport stream at the media presentation site (e.g., a monitored panelist location and/or a non-panelist audience member location). In some such examples, the transport stream corresponds to a Moving Picture Experts Group (MPEG) 2 transport stream sent according to a hypertext transfer protocol (HTTP) live streaming (HLS) protocol. However, the transport stream may additionally or alternatively correspond to and/or be sent according to any other past, present, or future protocol and/or format such as, for example, MPEG 4, an HTTP Secure protocol (HTTPS), a file transfer protocol (FTP), a secure file transfer protocol (SFTP).

Watermarking refers to techniques used to identify media such as television broadcasts, radio broadcasts, advertisements (television and/or radio), downloaded media, streaming media, prepackaged media, etc. Existing watermarking techniques identify media by embedding codes (e.g., a watermark), such as media identifying information and/or an identifier that may be mapped to media identifying information, into an audio and/or video component having a signal characteristic sufficient to hide the watermark. As used herein, the terms "code" or "watermark" are used interchangeably and are defined to mean any identification information (e.g., an identifier) that may be transmitted with, inserted and/or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and compared to reference watermarks and/or other metadata that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are hereby defined herein to mean "a proxy that may be used for identifying media by comparison with a reference database and that is generated from one or more inherent characteristics of the media."

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

In some examples, metadata embedded in the media is in a first format (e.g., a watermark, a code, etc.). In some examples, the metadata in the first format includes an audio watermark that is embedded in an audio portion of the media. Additionally or alternatively, the metadata in the first format can include a video (e.g., image) watermark that is embedded in a video portion of the media. Many presentation devices do not have access to the metadata in the first format, and/or in some cases, enough processing power to identify the metadata in the first format. Accordingly, in some examples, the service provider identifies the watermark, and converts the metadata into a second format readable by the presentation device. The metadata in the second format may correspond to, for example, metadata tags represented in a text format, such as a text format for inclusion in a timed text track file sent in association with the streaming media. In other examples, the metadata may be in the form of ID3 tags. More generally, the teachings disclosed herein are applicable to any type of in-band metadata or out-of-band metadata recognizable and/or extractable by the presentation device(s) on which the media is playing.

In some disclosed examples, streaming media is delivered to the media presentation device using HTTP Live Streaming (HLS). However, any other past, present, and/or future protocol(s) and/or method(s) of streaming media to the media device may additionally or alternatively be used such as, for example, an HTTP Secure (HTTPS) protocol, a custom application, etc. Although HTTP is mentioned in this example, any other past, present, and/or future webpage language may additionally or alternatively be used. In some disclosed examples, a media presentation device uses an application (e.g., an "app") to display media received via HLS. Additionally or alternatively, in some disclosed examples the media device uses a media player (e.g., a browser plugin, an app, a framework, an application programming interface (API), etc.) to present media received via HLS.

In examples illustrated herein, a user requests the webpage or uniform resource locator (URL) associated with media of interest from a service provider via a media presentation device. In some examples illustrated herein, the URL is directly associated with the media such that requesting the URL causes the media to start playing in the browser or application through which the URL is accessed. In other examples, the requested URL is not directly associated with the media of interest but includes a plugin (e.g., Adobe® Flash® Player, Microsoft® Silverlight®, etc.) with functionality to access or request a separate URL that is directly associated with the media of interest and to playback the corresponding media.

In some examples, as the media is provided to the presentation device for presentation, metadata associated with the media is also transmitted to the presentation device. In some examples, the metadata is transmitted in-band with the media. In some examples, the metadata is transmitted out-of-band with the media. In some examples illustrated herein, the metadata is embedded in the media as independent tags that can be identified and extracted by a media monitor implemented at the presentation device. Once extracted, the metadata may be combined with other information such as, for example, cookie data associated with the device, player state data, etc. and transmitted to, for example, a central facility for analysis and/or compilation with data collected from other devices.

Example methods, apparatus, systems, and articles of manufacture disclosed herein involve extracting or collecting metadata (e.g., watermarks, signatures, codes, metadata stored in an ID3 tag, extensible markup language (XML) based metadata, and/or any other type of in-band and/or out-of-band metadata in any other past, present, and/or future format) associated with streaming media transmissions (e.g., streaming audio and/or video) at a client presentation device. In some examples, as the metadata is extracted from the media, it is transmitted to an audience measurement entity (e.g., a central facility of the audience measurement entity) for collection and subsequent analysis. In some example methods, apparatus, systems, and articles of manufacture disclosed herein, the audience measurement entity also collects demographic information, either directly or indirectly, associated with users of client presentation devices based on identifiers (e.g., an Internet protocol (IP) address, a cookie, a device identifier, etc.) associated with those presentation devices. Audience measurement information may then be generated based on the metadata and the demographic information to indicate exposure metrics and/or demographic reach metrics. In some examples, the media exposure metrics are used to determine demographic reach of streaming media, ratings for streaming media, engagement indices for streaming media, user affinities associated with streaming media, broadcast media, and/or any other audience measure metric associated with streaming media, and/or locally stored media.

Example methods, apparatus, systems, and articles of manufacture disclosed herein may also be used to generate reports indicative of media exposure metrics on one or more different types of streaming media devices (e.g., personal computers, portable devices, mobile phones, tablets, etc.). For example, an audience measurement entity may generate media exposure metrics based on metadata extracted from the streaming media at the media presentation device and/or similar devices. A report is then generated based on the media exposure to indicate exposure measurements by device type. The report may also associate the media exposure metrics with demographic segments (e.g., age groups, genders, ethnicities, etc.) corresponding to the user(s) of the media device(s).

In some examples, to link demographics to the monitoring information to generate reliable media exposure metrics, the audience measurement entity establishes a panel of users who have agreed to provide their demographic information and to have their streaming media activities monitored. When an individual joins the panel, in such examples, they provide detailed information concerning their identity and demographics (e.g., gender, race, income, home location, occupation, etc.) to the audience measurement entity. In some examples, the audience measurement entity sets an identifier (e.g., a panelist cookie) on the presentation device that enables the audience measurement entity to identify the panelist. In particular, each panelist is provided with a media monitor that reports access(es) to streamed media to a central facility of the audience measurement entity. In some examples, the media monitor reports access(es) to streamed media as the access(es) occur (e.g., streaming). In some examples, the media monitor caches (e.g., stores, buffers, etc.) data identifying the access(es) to streamed media and transmits the cached data identifying the access(es) (referred to herein as access data) to the central facility. In the illustrated example, the media monitor transmits the identifier (e.g., in the form of a cookie) and the access data to the audience measurement entity.

In some examples, rather than (or in addition to) establishing a panel of users, the audience measurement entity may desire to collect media monitoring information using a census-wide approach where media metrics are collected from all or substantially all (e.g., 80% or more) audience members in a population. In some examples, the population is defined by all users of one or more apps, browsers, or other media players associated with media monitoring functionality disclosed herein. While census or universe-wide audience measurement data can provide accurate media metrics because they do not rely on statistical extrapolation, such approaches pose difficulties. For example, to provide accurate media monitoring, the exposure of audience members to media should be tracked on an ongoing basis with relatively small temporal granularity. For example, in many typical panel-based approaches, metadata extracted from media playing on a panelist's presentation device is transmitted to a central facility of an audience measurement entity every two or ten seconds. As a result, in such situations, there can be as many as thirty packets of information sent every minute from every panelist presentation device presenting media. In a census-based measurement system there may be hundreds of thousands or even millions of different people playing different types of media on one or more presentation devices. Providing sufficient bandwidth on the servers at the central facility of the audience measurement entity to receive upwards of thirty transmissions a minute from each of millions of devices is cost prohibitive, if not impracticable. Likewise, even if there is sufficient bandwidth at the central facility servers, there may be processing and/or storage constraints limiting the amount of data the central facility can handle.

To overcome the above obstacles to census level audience measurement, examples disclosed herein reduce the amount of data transmitted from any particular presentation device by selecting a subset of the extracted metadata for transmission to the central facility while omitting a separate subset of the extracted metadata. That is, in some examples, the selected subset of metadata tags excludes at least one metadata tag. While the amount of metadata could be reduced by increasing the time period between each extraction such that less metadata is collected, this reduces the granularity of the data. As a result, the collected data becomes less reliable. Accordingly, in examples disclosed herein, the media monitor does not reduce the frequency of metadata collected. Instead, individual metadata tags are collected at the same granularity discussed in the example above (e.g., every two seconds) but only a subset of the tags identified from the full series of extracted metadata tags (e.g., less than all of the metadata tags) are transmitted to the central facility. In some examples, the transmitted metadata tags in the subset are selected based on triggers that identify key metadata tags indicative of timing and content of presented media necessary for generating media metrics without selecting other metadata tags that provide redundant information to the key metadata tags.

In some examples, the selection of metadata tags for transmission is triggered based on media events detected by the media monitor at the media presentation device. In some examples, media events include a URL event corresponding to a change in the URL requested by the presentation device to access media. As a particular media program is associated with a particular URL, as long as a presentation device is accessing the same URL, it can be inferred that media being presented on the presentation device has not changed (i.e., the media must correspond to the media associated with the URL). Accordingly, in some examples, each time a URL event is detected (e.g., a new URL is requested) a subset of metadata tags (e.g., one metadata tag) is selected for transmission to the central facility. In some examples, the metadata tag selected for transmission is the first metadata tag extracted after the URL event. The timestamp contained within the first metadata tag serves to indicate the beginning of streaming of the media associated with the URL, which may corresponding to the beginning of exposure of the corresponding audience to the media.

In some examples, it may be desirable to know the ending time of streaming media. Accordingly, in some examples, each time a new URL is accessed, the most recent metadata tag extracted (e.g., the last metadata tag extracted before the URL change event) is selected for transmission to the audience measurement entity. As described above, while a subset of metadata tags are transmitted to the central facility, metadata tags are still being extracted by the media monitor of the presentation device and cached in a local memory. Thus, the last metadata tag extracted from a media associated with a particular URL can be identified at the time that the presentation device requests another URL (e.g., to begin streaming different media) because the last metadata tag will already be stored on the presentation device. In some examples, regardless of the length of exposure to media, only the first and last metadata tags associated with the streaming of the media will be transmitted to the central facility whereas all intermediate metadata tags will be omitted. In such examples, the total amount of data sent to the central facility of the audience measurement entity is significantly reduced compared to an implementation in which all extracted metadata tags are sent. Further, the information that would be provided from transmitting the entire series of metadata tags is preserved. For example, the first and last metadata tags extracted each include a timestamp indicating the beginning and ending of the streaming of the corresponding media and, thus, indicate the time period of duration of exposure of the audience of the presentation device to the media. Further, the first and last metadata tags include a media identifier to identify the particular media. These media identifiers can be compared to confirm that the media is in fact the same from the beginning time to the ending time. Thus, in some examples, there is no relationship between the rate at which metadata is embedded in and, thus, extracted from, the media (e.g., every two seconds) and the amount of data sent to the central facility.

While URL events serve in some examples as media events to trigger the selection or identification of key metadata tags for transmission to a central facility, in some examples, other media events associated with the media player may occur between the beginning and ending of the media stream (e.g., while the presentation device continues to access a single URL). Accordingly, in some examples, other media events trigger the selection of metadata tags for reporting to the audience measurement entity. Example events include player state events corresponding to a change in a state of the media player presenting the media. Different player states include, for example, play, pause, stop, replay, rewind, forward, and skip. As with the URL events, in some examples, a most recent metadata tag extracted prior to a player state event (e.g., last metadata tag extracted before the event) and/or a next metadata tag extracted immediately following the player state event (e.g., first metadata tag extracted after the event) are selected for transmission to the central facility. In this manner, stop events, pause events, replay events, etc., and their corresponding times and durations between the beginning and ending of a media presentation are accounted for based on the associated metadata tags (including timestamps) transmitted to the central facility.

In some disclosed examples, media event tags corresponding to the media events (e.g., URL events and/or player state events) are generated and transmitted along with the selected metadata tags to the central facility. In this manner, the particular reason (e.g., media event) that each individual metadata tag was selected for reporting can be determined. In some examples, URL events can be inferred from adjacent metadata tags based on whether the tags have a same media identifier corresponding to the same media (thereby indicating the same URL) or have different media identifiers corresponding to different media (thereby indicating a change in URL between the two tags). In some examples, only player state event tags are transmitted along with the metadata tags. As used herein, "metering data" refers to the combination of both the media event tags and the metadata tags transmitted to a central facility.

Further, in some examples, to account for any other unexpected circumstance occurring during the presentation of media associated with a particular URL, additional metadata tags may be selected for transmission to the central facility on a periodic or aperiodic basis. For example, while every metadata tag is extracted by the meter associated with the presentation device, the metadata tag(s) extracted after a threshold period of time since a prior report to the audience measurement entity and/or after a threshold number of other metadata tags have been reported to the audience measurement entity are transmitted to the central facility. Using this approach in connection with transmitting the metadata tags identified by the key media events described above, less data is reported to the central facility of the audience measurement entity with a larger temporal granularity without compromising the accuracy of information thereby enabling reliable audience measurement without overly taxing the bandwidth of the reporting network and/or the storage and/or processing capabilities of the server of the central facility. This distributed data selection logic thus solves the technical problems of collecting accurate audience measurement statistics within a computer network of limited bandwidth, processing, and/or storage capabilities.

FIG. 1 is a block diagram of an example system 100 constructed in accordance with the teachings of this disclosure for measuring exposure to streaming media. The example system 100 of FIG. 1 monitors media provided by an example media provider 102 for presentation on an example media presentation device 104 via an example network 106. The example system 100 of FIG. 1 includes an example media monitor 108, and an example central facility 110 of an audience measurement entity 112.

The media provider 102 of the illustrated example of FIG. 1 corresponds to any one or more media provider(s) capable of providing media for presentation via the presentation device 104. The media provided by the media provider(s) 102 can provide any type(s) of media, such as audio, video, multimedia, etc. Additionally, the media can correspond to live media, streaming media, broadcast media, stored media, on-demand media, etc. In some examples, the media contains metadata in a first format (e.g., signatures, watermarks, etc.). In some examples, metadata embedded in the media (e.g., watermarks, ID3 tags, etc.) is provided to the media provider(s) 102 from an audience measurement entity.

The service provider 114 of the illustrated example of FIG. 1 provides media services to the presentation device 104 via, for example, webpages including links (e.g., hyperlinks, embedded media, etc.) to media provided by the media provider 102. In some examples, the media provider 102 and the service provider 114 are the same entity. In some examples, the service provider 114 modifies the media provided by the media provider 102 prior to transmitting the media to the presentation device 104. In some examples, the service provider 114 of FIG. 1 extracts metadata from the media obtained from the media provider 102. For example, the service provider 114 of the illustrated example implements functionality provided by a software development kit (SDK) 116 provided by an audience measurement entity 112 to extract one or more audio watermarks, one or more video (e.g., image) watermarks, etc., embedded in the audio and/or video of the media obtained from the media provider 102. (For example, the media may include pulse code modulation (PCM) audio data or other types of audio data, uncompressed video/image data, etc.). In some examples, the service provider 114 of FIG. 1 determines (e.g., derives, decodes, converts, etc.) the metadata (e.g., such as media identifying information, source identifying information, etc.) included in or identified by a watermark embedded in, associated with, and or transmitted with the media, and converts this metadata from the first format (e.g., watermarks) into a second format of metadata (e.g., timed text tracts, ID3 tags, etc.) embedded in the media for transmission to the presentation device 104. Additionally or alternatively, the service provider 114 may embed the second format of metadata into a separate metadata document, such as by encoding the metadata into an M3U8 or other data file that is to be associated with (e.g., included in, appended to, sent prior to, etc.) the media. The second format of the metadata may be any type of in-band metadata or out-of-band metadata recognizable and extractable by the media monitor 108.

In some examples, the service provider 114 prepares media for streaming regardless of whether (e.g., prior to) a request is received from the presentation device 104. In such examples, the already-prepared media is stored in a data store of the service provider 114 (e.g., such as in a flash memory, magnetic media, optical media, etc.). In other examples, the service provider 114 prepares the media for streaming in response to a request received from the presentation device 104. In some such examples, in addition to the information (e.g., media identifying information, source identifying information, etc.) contained in the original metadata of the first format, the service provider 114 adds a timestamp with each individual metadata tag converted to the second format. Timestamping (e.g., recording a time that an event occurred) enables accurate identification and/or correlation of media that was presented and/or the time that it was requested by or transmitted to the presentation device 104. Once the service provider 114 has converted the metadata to the second format and inserted a timestamp into the metadata, the service provider 114 then streams the media to the presentation device 104 via the network 106 using any suitable streaming protocol. While the particular details to implement the service provider 114 are not provided herein, many example implementations of the service provider 114 may be used, such as the example implementations disclosed in U.S. patent application Ser. No. 13/341,646, filed on Dec. 30, 2011; U.S. patent application Ser. No. 13/341,661, filed on Dec. 30, 2011; U.S. patent application Ser. No. 13/443,596, filed on Apr. 10, 2012; U.S. patent application Ser. No. 13/455,961, filed on Apr. 25, 2012; U.S. patent application Ser. No. 13/472,170, filed on May 15, 2012; U.S. patent application Ser. No. 13/778,114, filed on Feb. 26, 2013; U.S. patent application Ser. No. 13/793,974, filed on Mar. 11, 2013; U.S. patent application Ser. No.

13/793,983, filed on Mar. 11, 2013; and U.S. patent application Ser. No. 13/793,991, filed on Mar. 11, 2013; all of which are hereby incorporated by reference herein in their entireties.

The network 106 of the illustrated example is the Internet. Additionally or alternatively, any other network(s) communicatively linking the service provider 114 and the presentation device such as, for example, a private network, a local area network (LAN), a virtual private network (VPN), etc. may be used. The network 106 may comprise any number of public and/or private networks using any type(s) of networking protocol(s).

The presentation device 104 of the illustrated example of FIG. 1 is a computing device that is capable of presenting streaming media provided by the service provider 114 via the network 106. In some examples, the presentation device 104 is capable of directly presenting media (e.g., via a display) while, in some other examples, the presentation device 104 presents the media on separate media presentation equipment (e.g., speakers, a display, etc.). The presentation device 104 may be, for example, a tablet, a desktop computer, a laptop computer, a mobile computing device, a television, a smart phone, a mobile phone, an Apple® iPad®, an Apple® iPhone®, an Apple® iPod®, an Android™ computing device, a Palm® webOS® computing device, etc. In the illustrated example, the presentation device 104 includes a media monitor 108 (sometimes referred to as a "meter" or "media meter"). In the illustrated example, the media monitor 108 is implemented by metering functionality in a media player (e.g., a browser, a local application, etc.) that presents streaming media provided by the service provider 114. For example, the media monitor 108 may additionally or alternatively be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. In the illustrated example, the media monitor 108 reports metering data (e.g., metadata tags and any corresponding media event tags) to the central facility 110. While, for clarity, a single presentation device 104 and associated media monitor 108 is illustrated in the example of FIG. 1, any number and/or type(s) of media presentation devices and associated media monitors may be used.

In the illustrated example, the central facility 110 of the illustrated example is operated by an audience measurement entity (e.g., the Nielsen Company (US) LLC) and includes an interface to receive metering data (e.g., metadata tags and media event tags) reported from the media monitor 108 of the presentation device 104 via the network 106. In the illustrated example, the central facility 110 includes an HTTP interface to receive HTTP requests that include the metering information. The HTTP requests are sent with the metering information in their payload. The requests may not be intended to actually retrieve content, but are instead used as a vehicle to convey the metering information. Thus, the requests may be referred to as dummy requests in that unlike a typical HTTP request sent by a browser or app, the document requests are not actually intended to retrieve any media. The central facility 110 is provided with software (e.g., a daemon) to extract the metering information from the payload of the dummy request(s). Additionally or alternatively, any other method(s) to transfer the metering information may be used such as, for example, an HTTP Secure protocol (HTTPS), a file transfer protocol (FTP), a secure file transfer protocol (SFTP), an HTTP and/or HTTPS GET request, an HTTP POST message and/or HTTPS POST request, etc. In the illustrated example, the central facility 110 stores and analyzes the extracted metering information received from a plurality of media monitors 108 at a plurality of different presentation devices.

In some examples, the presentation device 104 is associated with a people meter 118. In some examples, as illustrated in FIG. 1, the people meter 118 is implemented on the presentation device 104. In other examples, the people meter 118 is implemented in a separate electronic device apart from the presentation device 104. In some examples, the people meter 118 contains functionality to monitor and/or track audience members exposed to media playing on the presentation device by, for example, counting the number of audience members, identifying demographic characteristics of the audience members, and/or specifically identifying the audience members (e.g., when the audience members are consenting panelists in a particular research study). The people meter 118 may be implemented in any of a variety of ways based on different functionality. In some examples, the people meter 118 counts and/or identifies the audience members actively by prompting the audience members to register (e.g., login) or otherwise self-identify and/or to identify their number and/or certain corresponding demographic characteristics (e.g., male/female, age bracket, etc.). In some examples, the people meter 118 counts and/or identifies the audience members passively using one or more sensors and/or other sources of feedback. For example, audio captured by a microphone associated with the presentation device 104 and/or images (e.g., pictures, video) captured by a camera associated with the presentation device 104 may be analyzed to monitor the audience members.

Figure 2:
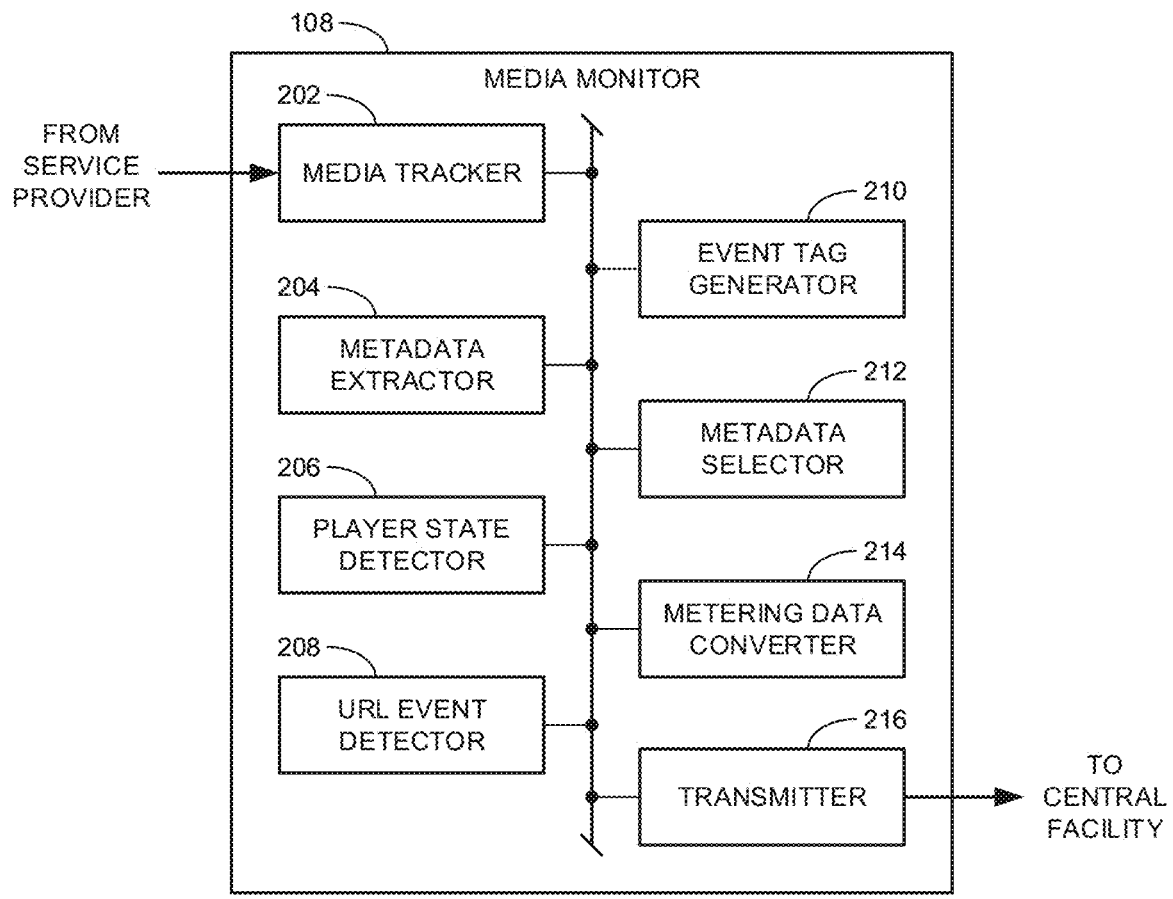
FIG. 2 is a block diagram of an example implementation of the example media monitor of FIG. 1.

FIG. 2 is a block diagram of an example implementation of the media monitor 108 of FIG. 1. The example media monitor 108 of FIG. 2 includes an example media tracker 202, an example metadata extractor 204, an example player state detector 206, an example URL event detector 208, an example event tag generator 210, an example metadata selector 212, an example metering data converter 214, and an example transmitter 216.

The example media tracker 202 of FIG. 2 is implemented by a processor executing instructions, but it could additionally or alternatively be implemented by an analog circuit, an ASIC, DSP, FPGA, and/or other circuitry. In the illustrated example, the media tracker 202 interacts with a media player to display media via the presentation device 104. In the illustrated example, the media player is any type of media presenting framework. For example, the example media tracker 202 may interact with a QuickTime® application programming interface (API), an Adobe® Flash® media presentation framework, etc. In the illustrated example, the media tracker 202 monitors streaming media received from the service provider 114 and presented via the media player for metadata associated with the media. In some examples, at certain points in time, either based on a schedule or based on cues embedded in the media stream, the media tracker 202 identifies metadata to be extracted. For example, at periodic intervals (e.g., every two seconds, every ten seconds, etc.) a specific metadata tag may have been embedded in the media by the service provider 114. As each metadata tag is detected by the media tracker 202, it will invoke the example metadata extractor 204 to extract the metadata tag.

Figure 3:
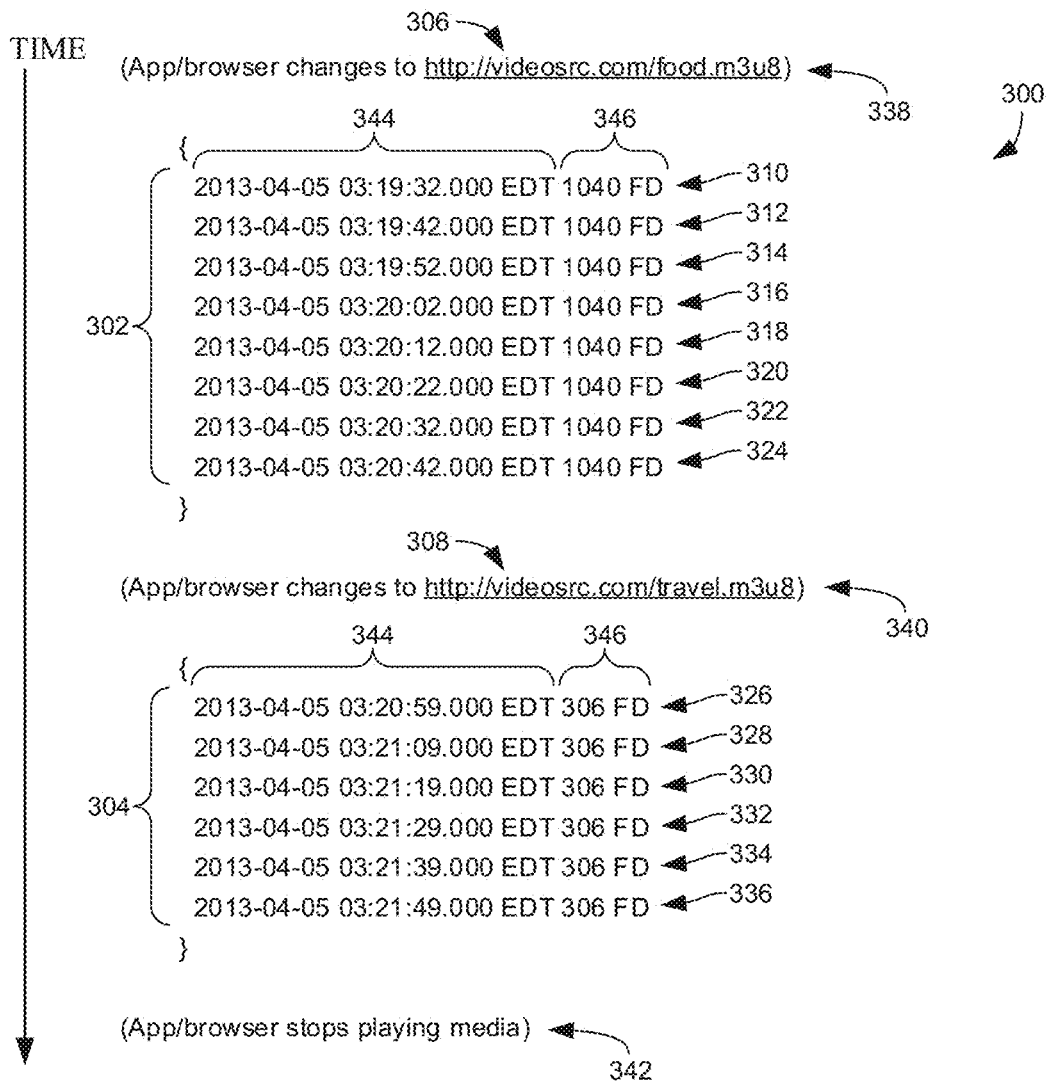
FIG. 3 illustrates an example series of metadata tags extracted by the media monitor of FIGS. 1 and/or 2 over a period of time.

The example metadata extractor 204 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202 and the metadata extractor 204 are implemented by the same physical processor. In the illustrated example, the example metadata extractor 204 retrieves or extracts a metadata tag in response to the trigger provided by the media tracker 202. Over the course of the presentation of the streaming media, the example metadata extractor extracts a series of metadata tags associated with the media. For example, a metadata tag may be extracted every 2 seconds or at any other frequency. An example series of metadata tags extracted by the example metadata extractor is shown in FIG. 3. In some examples, multiple (e.g., all) metadata tags associated with a particular media presentation are extracted and separately stored in memory by the metadata extractor 204. In some examples, later metadata tags replace previously extracted and stored metadata tags such that only a most recent portion of the series of metadata tags is stored in memory. In some such examples, the metadata tags are gathered to a circular buffer. In some examples, only the most recent metadata tag is stored by the media monitor 108.

The example player state detector 206 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, and the player state detector 206 are implemented by the same physical processor. In the illustrated example, the player state detector 206 detects a state of the media player presenting the media on the presentation device. The state of the media player corresponds to any state associated with the media player such as, for example, play, pause, stop, replay, rewind, forward, skip, etc. In some examples, the player state detector 206 detects a state of the media player by detecting presses (e.g., mouse clicks) of player control buttons in the browser and/or application presenting the media. In some examples, the player state detector 206 monitors for commands from a remote control associated with the media presentation device 104. In some examples, the player state detector 206 monitors the time the media is broadcast (e.g., streamed to the media presentation device 104) compared to the time of playback to determining any time shifting events corresponding to player state events. While the particular details to implement the player state detector 206 are not provided herein, many example implementations may be used, such as the example implementations disclosed in U.S. patent application Ser. No. 11/916,428, filed on Jun. 3, 2005, now U.S. Pat. No. 8,238,727; and U.S. patent application Ser. No. 10/483,825, filed on Apr. 17, 2003, now U.S. Pat. No. 7,248,777; both of which are hereby incorporated by reference herein in their entireties. In some examples, a change in player state detected by the player state detector 206 invokes the example event tag generator 210.

The example URL event detector 208 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, the player state detector 206, and the URL event detector 208 are implemented by the same physical processor (e.g., a semiconductor based logic circuit). In the illustrated example, the URL event detector 208 detects a change in the uniform resource locator (URL) being accessed by the presentation device 104. In the illustrated example, a change in URL is indicative of a user request (and being exposed to) a different media presentation. In some examples, the URL event detector 208 monitors the URL requested by the presentation device 104 to detect any change in the URL. In some examples, a change in URL is inferred from a comparison of adjacent metadata tags extracted by the example metadata extractor 204. For example, at some point in time, the metadata extractor 204 may extract a first metadata tag from media streaming on the presentation device 104 followed by a second metadata tag from media streaming on the presentation device 104. In some examples, media identifying information in each of the metadata tags may indicate that the first and second metadata tags are associated with different media presentations. If so, the URL event detector 208 may infer that there was a change in URL between the first metadata tag and the second metadata tag to account for the different media being presented on the presentation device 104. In some examples, the URL event detector 208 of the example media monitor 108 is omitted because any URL change can be inferred during post-processing of the metadata (e.g., by an audience measurement entity to which the metadata is reported) in the same manner as described above, thereby reducing the amount of data transmitted to the central facility 110. In some examples, a change in URL detected by the URL event detector 208 invokes the example event tag generator 210. In some examples, as the player state detector 206 and the URL event detector 208 invoke the event tag generator, both the player state detector 206 and the URL event detector 208 are implemented together as a single media event detector.

The example event tag generator 210 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, the player state detector 206, the URL event detector 208, and the event tag generator 210 are implemented by the same physical processor. In the illustrated example, the event tag generator 210 generates a media event tag corresponding to a media event associated with the presentation of the media. In some examples, the media event corresponds to at least one of a change in URL or a change in state of the media player. Accordingly, in some examples, the media event tag is a player state event tag corresponding to a change in state of the media player. In some examples, the player state event tag contains information indicative of the state to which the media player changed. Additionally or alternatively, in some examples, the media event tag is a URL event tag corresponding to a change in the URL accessed by the presentation device 104. In some examples, the media event tag(s) (e.g., the player state event tag(s) and/or the URL event tag(s)) are transmitted, along with the metadata tags, to the central facility 110 for subsequent analysis and/or aggregation with metering data (e.g., metadata tags and media event tags) collected from other presentation devices.

The example metadata selector 212 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, the player state detector 206, the URL event detector 208, the event tag generator 210, and the metadata selector 212 are implemented by the same physical processor. In the illustrated example, the metadata selector 212 selects certain metadata tags (e.g., a subset) from the series of metadata tags extracted by the metadata extractor 204 for reporting or transmission to the central facility 110. In some examples, the selected tags or subset of metadata tags corresponds to less than all of the tags extracted by the metadata extractor 204. Tags which are not selected are not reported to the central facility 110. In some examples, the metadata selector 212 selects metadata tags to be omitted from transmission to the central facility 110.

In some examples, the metadata selector 212 selects which metadata tags are to be transmitted and/or which metadata tags are to be omitted from transmission based on the media events detected by the player state detector 206 and/or the URL event detector 208, and/or the corresponding media event tags generated by the event tag generator 210. For example, each time a URL change event is detected (e.g., a new URL is requested indicative of a new media presentation requested), the metadata selector 212 selects a metadata tag extracted after the URL event for submission to the central facility 110 to provide a metadata tag that is associated with media corresponding to the new URL (e.g., after the change). Additionally or alternatively, in some examples, the metadata selector 212 selects a metadata tag extracted before the URL event for submission to the central facility 110 to provide a metadata tag that is associated with media corresponding to the old URL (e.g., before the change). In some examples, the metadata selector 212 selects the metadata tag(s) approximate at the time (e.g., within +/−5 seconds in a system in which metadata tags are embedded every 2 seconds, within +/−15 seconds in a system in which metadata tags are embedded every 10 seconds, etc.) of the occurrence of the URL event to reduce the likelihood that other URL changes will occur in the intervening period between the selected metadata tag and the URL event being used as the trigger for making the selection.

In some examples, where the selected metadata tag corresponds to a tag extracted after the URL event, the metadata selector 212 selects the first metadata tag extracted immediately after the URL event. In this manner, with the metadata tag being closest in time to the URL change as possible (based on the scheduling of the metadata tag occurrences (e.g., every two seconds)), the selected metadata tag can serve as an approximation of the starting time of the streaming of the media associated with the new URL (e.g., after the URL event) to the presentation device 104. In some examples, where the selected metadata tag corresponds to a tag extracted before the URL event, the metadata selector 212 selects the last metadata tag extracted before the URL event. In this manner, with the metadata tag being closest in time to the URL change as possible, the selected metadata tag can serve as an approximation of the ending time of the streaming of the media associated with the old URL (e.g., before the URL event) to the presentation device 104. While the last metadata tag before a URL event may be indicative of an ending of the streaming of the media to the presentation device 104, the metadata tag does not necessarily indicate that the media presentation has played through to its end because a user may have unilaterally changed to the new URL during the middle of the presentation of the media associated with the old URL. However, whether the media presentation actually ended can be determined based on the time between the beginning of the media presentation (e.g., indicated by an earlier metadata tag selected for transmission by the metadata selector 212) and the last metadata tag before the URL event when compared with a known duration for the media presentation.

In some examples, the first metadata tag extracted immediately after a URL is requested and the last metadata tag extracted before the URL changes are the only metadata tags selected for transmission to the central facility 110. As long as the URL does not change, the media presented on the presentation device 104 will not change because the URL is associated with the particular media being presented. Accordingly, all intervening metadata tags extracted between the first and the last metadata tags can be omitted because they correspond to the same media presentation and, therefore, provide little, if any, additional information needed by the central facility to identify the media presentation and/or to associate the user(s) of the presentation device 104 with exposure to the media. This disclosed example can provide a significant reduction in the amount of data that is transmitted to, stored, and/or processed by the central facility 110. In some examples, the metadata selector 212 selects other metadata tags in addition to the first and the last metadata tag for redundancy and/or to guard against any unforeseen circumstances while still omitting some of the metadata tags from being reported. For instance, in some examples, the metadata selector 212 selects or identifies additional metadata tags within the series of all metadata tags extracted by the metadata extractor 204 based on periodic or aperiodic intervals. For example, the metadata selector 212 may select adjacent metadata tags in the series of metadata tags separated by a threshold number of metadata tags (e.g., every tenth tag) or a threshold amount of time (e.g., one metadata tag after every minute). In this manner, metadata tags at a relatively high level of temporal granularity are reported to the central facility 110 for the sake of redundancy as a heartbeat signal (e.g., indicating the device is still powered on and the meter is still working) while still substantially reducing the total amount of data transmitted to, stored, and/or processed by, the central facility 110.

In some circumstances, a user may interact with media through the media player by, for example, pausing or stopping the presentation of the media, fast forwarding or skipping through portions of content (for pre-recorded media), or rewinding or replaying the media. In such circumstances, the first metadata tag extracted after requesting the URL and the last metadata tag extracted before leaving the URL may be insufficient to adequately capture the actual exposure of the audience members for purposes of generating reliable audience exposure metrics. Accordingly, in some examples, the metadata selector 212 selects metadata tags for transmission to the central facility 110 based on player state change events. In some examples, the metadata selector 212 selects the metadata tag(s) extracted approximate in time (e.g., within +/−15 seconds) with the occurrence of the URL event. In some examples, the metadata selector 212 selects a most recent metadata tag extracted prior to (e.g., the last tag extracted before) the player state event. In some examples, the metadata selector 212 selects the next metadata tag extracted following (e.g., the first tag extracted immediately after) the player state event. In some examples, as with URL events, the metadata selector 212 selects metadata tags both before and after a player state event.

Figure 4:
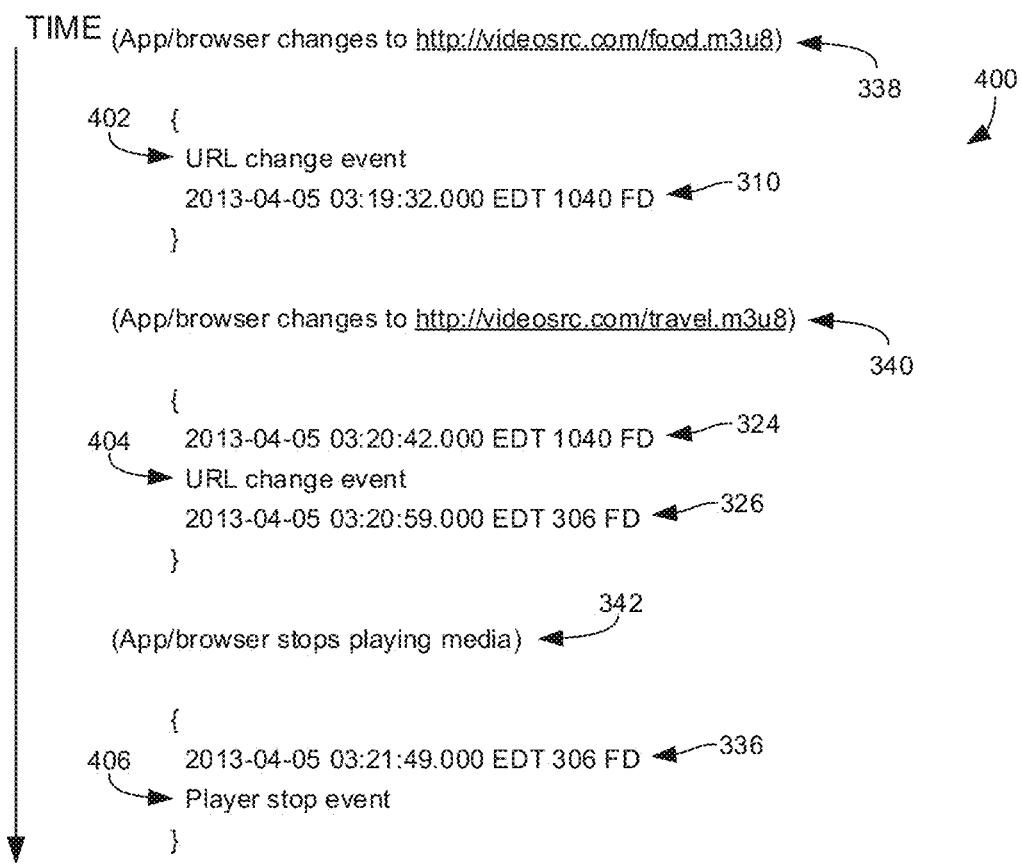
FIG. 4 illustrates an example series of metering data selected from the example series of metadata tags of FIG. 3 for transmission by the media monitor of FIGS. 1 and/or 2.

The example metering data converter 214 of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, the player state detector 206, the URL event detector 208, the event tag generator 210, the metadata selector 212, and the metering data converter 214 are implemented by the same physical processor. In the illustrated example, the metering data converter 214 converts the metadata retrieved by the metadata extractor 204 into a converted metadata format for transmission to the central facility 110. For example, the metering data converter 214 may encrypt, decrypt, compress, modify, etc., the metadata and/or portions of the metadata to, for example, reduce the amount of data to be transmitted to the central facility 110. Additionally or alternatively, in some examples, the metering data converter 214 similarly converts the media event tags generated by the event tag generator 210 into a converted media event tag format for transmission to the central facility 110. In some examples, the metering data converter 214 combines the metadata tags and the media event tags together to associate the media events (represented by the media event tags) with the corresponding metadata tags selected by the metadata selector 212. In some examples, the metering data (e.g., the metadata tags and the media event tags) are combined or associated based on the ordering in which each individual tag is transmitted to the central facility 110. In some examples, the metering data converter 214 modifies the media event tags to include identifying information from the corresponding metadata tags (e.g., the media event tags are modified to include the timestamp information from the preceding and/or follow metadata tag(s) selected for transmission based on the associated media event). In some examples, this information is included in each media event tag when it is generated by the event tag generator 210. An example series of metering data (e.g., ordered metadata tags and corresponding media event tags) to be transmitted to the central facility 110 is shown in FIG. 4.

The transmitter 216 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media tracker 202, the metadata extractor 204, the player state detector 206, the URL event detector 208, the event tag generator 210, the metadata selector 212, the metering data converter 214, and the transmitter 216 are implemented by the same physical processor. In the illustrated example, the transmitter 216 transmits the converted metering data to the central facility 110 via, for example, the Internet. While the converted metering data is transmitted in substantially real-time in the illustrated example, in some examples, the converted metering data is stored, cached, and/or buffered before being transmitted to the central facility 110. Also, while the converted metering data is additionally or alternatively transmitted to the central facility 110 in the illustrated example, in some examples, the metering data is additionally or alternatively transmitted to a different destination such as, for example, a display of the presentation device 104. Additionally or alternatively, the transmitter 216 may transmit an identifier of the media monitor 108 and/or the presentation device 104 to enable the central facility 110 to correlate the metering data with a panelist, a group of panelists, demographic(s), etc. In the illustrated example, the central facility 110 is associated with an audience measurement company and is not involved with the delivery of media to the presentation device. In some examples, the central facility 110 applies a timestamp upon receipt of the converted metering data.

While an example manner of implementing the media monitor 108 of FIG. 1 is illustrated in FIG. 2, one or more of the elements, processes and/or devices illustrated in FIG. 2 may be combined, divided, re-arranged, omitted, eliminated and/or implemented in any other way. Further, the example media tracker 202, the example metadata extractor 204, the example player state detector 206, the example URL event detector 208, the example event tag generator 210, the example metadata selector 212, the example metering data converter 214, the example transmitter 216, and/or, more generally, the example media monitor 108 of FIG. 2 may be implemented by hardware, software, firmware and/or any combination of hardware, software and/or firmware. Thus, for example, any of the example media tracker 202, the example metadata extractor 204, the example player state detector 206, the example URL event detector 208, the example event tag generator 210, the example metadata selector 212, the example metering data converter 214, the example transmitter 216, and/or, more generally, the example media monitor 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media tracker 202, the example metadata extractor 204, the example player state detector 206, the example URL event detector 208, the example event tag generator 210, the example metadata selector 212, the example metering data converter 214, and/or the example transmitter 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example media monitor 108 of FIG. 1 may include one or more elements, processes and/or devices in addition to, or instead of, those illustrated in FIG. 2, and/or may include more than one of any or all of the illustrated elements, processes and devices.

FIG. 3 illustrates an example series of metadata tags 300 extracted by the example media monitor 108 of FIGS. 1 and/or 2 over a period of time. As shown in the illustrated example, the series of metadata tags 300 is divided into first and second sets of metadata tags 302, 304 corresponding to first and second URLs 306, 308, respectively. The first set of metadata tags 302 begins with a first metadata tag 310, is followed by successive intermediate metadata tags 312, 314, 316, 318, 320, 322, and ends with a last metadata tag 324. The second set of metadata tags 304 begins with a first metadata tag 326, followed by successive intermediate metadata tags 328, 330, 332, 334, and ends with a last metadata tag 336. For purposes of explanation, the series of metadata tags 300 are shown in temporal relationship with a first URL event 338 corresponding to a request for the first URL 306, a second URL event 340 corresponding to request for the second URL 308, and a player state event 342 corresponding to the stopping of the media being presented via the presentation device 104. Although the media events (e.g., the first and second URL events 338, 340, and the player state event 342) are shown in the illustrated example, they are not actually a part of the series of metadata tags 300. That is, the media events 338, 340, 342 correspond to the information designated inside parentheses whereas the series of metadata tags 300 corresponds to the tags 310-324 and 326-336 shown inside the curly braces (demarcating the first and second sets of metadata tags 302, 304) in the illustrated example.

As shown in the illustrated example of FIG. 3, each of the metadata tags 310, 312, 314, 316, 318, 320, 322, 324, 326, 328, 330, 332, 334, 336 includes a timestamp 344 and a media identifier 346. The timestamp 344 contains the timestamp information generated by the service provider 114 at the time the media was requested and the corresponding metadata tag was embedded in the media stream. The media identifier 346 contains the media identifying information contained in the original metadata (e.g., watermarks, signatures, codes, etc.) included in the media from the media provider 102. In the illustrated example, the media identifier 346 is a station identifier (SID) that identifies a particular station, which can be used in combination with the timestamp 344 to look up the particular media being presented based on a program schedule for the identified station at the identified time. In other examples, such as where the media is not from a station that has a scheduled programming lineup, the media identifier 346 may be a string of characters that specifically (e.g., uniquely) identifies the media.

In the illustrated example, media does not begin playing until the first URL 306 is requested. At that point, media associated with the first URL 306 begins streaming to the presentation device 104. As a result, as shown in the illustrated example, the metadata extractor 204 begins extracted metadata tags. In the illustrated example, each successive metadata tag 310, 312, 314, 316, 318, 320, 322, 324, 326, 328, 330, 332, 334, 336 is extracted ten seconds after the preceding metadata tag as indicated by the timestamps 344 in the tags. The one exception to the ten second intervals between tags in the example of FIG. 3 is the first metadata tag 326 of the second set of metadata tags 304 because of some delay due to the URL event 340. Further, as shown in the illustrated example, the media identifier 346 for successive metadata tags 310, 312, 314, 316, 318, 320, 322, 324, 326, 328, 330, 332, 334, 336 remains unchanged during each of the first and second sets of metadata tags 302, 304. The media identifier 346 remains unchanged for each set of metadata tags because each set corresponds to a single media presentation associated with a single URL. That is, each of the metadata tags 310, 312, 314, 316, 318, 320, 322, 324 in the first set of metadata tags 302 has the same media identifier (e.g., station identifier (SID)) corresponding to the media associated with the first URL 306. Similarly, each of the metadata tags 326, 328, 330, 332, 334, 336 in the second set of metadata tags 304 has the same media identifier corresponding to the media associated with the second URL 308. Accordingly, much of the information between successive tags is redundant. Therefore, in accordance with the teachings disclosed herein, the total amount of metadata tags transmitted to the central facility is significantly reduced as illustrated in FIG. 4.

FIG. 4 illustrates an example series of metering data 400 selected from the example series of metadata tags 300 of FIG. 3 for transmission by the media monitor 108 of FIGS. 1 and/or 2. In the illustrated example, the media events (including the first URL event 338, the second URL event 340, and the player state event 342) of FIG. 3 are again demarcated via parentheses and form no part of the series of metering data 400. However, in some examples, the URLs are returned as part of the metering data. In the example of FIG. 4, the metering data 400 includes the tags shown inside the curly braces. That is, only that which is shown inside the curly braces is actually transmitted to the central facility 110 in this example. Thus, the placement of the media events (designated via parentheses) between portions of the series of metering data 400 in the illustrated example of FIG. 4 is for purposes of explanation to show the temporal relationship of the metering data to the media events. Nevertheless, the URLs and/or other data may be returned in some examples.

In the illustrated example, the series of metering data 400 includes both metadata tags and media event tags. In particular, the series of metering data 400 includes the first metadata tag 310 of the first set of metadata tags 302 from FIG. 3, the last metadata tag 324 of the first set of metadata tags 302 from FIG. 3, the first metadata tag 326 of the second set of metadata tags 304 from FIG. 3, and the last metadata tag 336 of the second set of metadata tags 304 from FIG. 3. Further, the series of metering data 400 includes several media event tags including a first URL event tag 402 corresponding to the first URL event 338, a second URL event tag 404 corresponding to the second URL event 340, and a player state event tag 406 corresponding to the player state event 342. In the illustrated example, the metadata tags and media event tags in the series of metering data 400 are ordered for transmission in the order of occurrence. That is, the first URL event precedes the first metadata tag 310 of the first set of metadata tags 302, the second URL event is preceded by the last metadata tag 324 of the first set of metadata tags 302 and followed by the first metadata tag 326 of the second set of metadata tags 304, and the last metadata tag 336 of the second set of metadata tags 304 is followed by the player state event tag 406. In this manner, the media events can be readily associated with the corresponding metadata tag(s) selected by the metadata selector 212 for transmission to the central facility 110.

More particularly, in some examples, as the first URL 306 is requested, the URL event detector 208 detects the first URL event 338. In some such examples, the event tag generator 210 generates the first URL event tag 402. In some examples, based on the detected first URL event 338, the metadata selector 212 identifies or selects the first metadata tag extracted by the metadata extractor 204 immediately after the URL event 338, which corresponds to the first metadata tag 310 of the first set of metadata tags 302 of the series of metadata tags 300 of FIG. 3. Thus, in the illustrated example, when the first URL event tag 402 is transmitted, it is immediately followed by the transmission of the first metadata tag 310. As the media associated with the first URL 306 continues to be streamed, the metadata extractor 204 successively extracts each of the intermediate metadata tags 312, 314, 316, 318, 320, 322 of the first set of metadata tags 302. However, the metadata selector 212 does not select any of the intermediate metadata tags for transmission because there is no media event to trigger such a selection. The metadata extractor 204 then extracts the last metadata tag 324 of first set of metadata tags 302. However, it is not until the URL event detector 208 detects the second URL event 340 that the metadata selector 212 selects the last metadata tag 324 for transmission to the central facility 110. For this reason, the second URL event 340 is shown as occurring earlier in time to the transmission of the last metadata tag 324 even though the last metadata tag 324 was extracted before the second URL event 340 occurs. In some examples, the ordering is changed. However, in the illustrated example, the second URL event tag 404 is transmitted after transmitting the last metadata tag 324. Immediately following the transmission of the second URL event tag 404, the first metadata tag 326 of the second set of metadata tags 304 is also transmitted. The first metadata tag 326 is selected for transmission by the metadata selector 212 because it is the first tag extracted by the metadata extractor 204 immediately after the second URL event 340. In the illustrated example, the metadata extractor 204 continues to extract the intermediate metadata tags 328, 330, 332, 334 of the second set of metadata tags 304 followed by the last metadata tag 336. After the last metadata tag 336 is extracted, the metadata selector 212 selects the last metadata tag 336 for transmission based on the player state event 342. However, to maintain the ordering of data inside the series of metering data 400, the last metadata tag 336 is transmitted followed by the player state event tag 406.

In some examples, the ordering of transmission of the tags in the series of metering data 400 is different. For instance, as the second URL event 340 is the basis for selecting both the last metadata tag 324 extracted before the URL event 340 and the first metadata tag 326 after the URL event 340, in some examples, the URL event tag 404 is transmitted when the URL event 340 is detected followed by both metadata tags 324, 326. In some examples, the URL event tags are not included in the series of metering data 400. Rather, the URL events 338, 340 can be inferred from the transmitted metadata tags 310, 324, 326, 336. For example, the media monitor 108 does not collect metadata until a URL associated with media has been requested. Thus, the mere existence of the first metadata tag 310 indicates that a new URL has been accessed. Likewise, the change in the media identifier 346 between the last metadata tag 324 and the first metadata tag 326 indicates that different media is being streamed, which corresponds to a change in URL. Thus, adjacent metadata tags that are associated with different media indicate that a change in URL occurred between the two metadata tags. In some examples, the player state event tag 406 is still transmitted to enable the central facility 110 to distinguish between media that is still streaming but has not arrived at another URL change (to trigger the transmission of another metadata tag) and media that has stopped streaming because the media player has stopped.

Accordingly, in some examples, the only information within the series of metering data 400 that is sent to the central facility 110 are four metadata tags (e.g., the metadata tags 310, 324, 326, 336) and one media event tag (e.g., the player state event tag 406). This is a substantial reduction from the amount of data extracted from the media as indicated in the series of metadata tags 300 of FIG. 3 because all of the intermediate metadata tags 312, 314, 316, 318, 320, 322, 328, 330, 332, 334 are omitted from the series of metering data 400. Furthermore, if the metadata tags were extracted at two second intervals (instead of ten second intervals as illustrated), the total number of metadata tags in the series of metadata tags 300 would be five times greater. However, there would be no increase in the number of tags transmitted to the central facility 110 as part of the series of metering data 400 further illustrating the substantial reduction in information transmitted in accordance with the teachings disclosed herein. Further still, while an increase in the duration of the media would add to the amount of metadata extracted, it has no effect on the amount of metadata transmitted and still enables the central facility 110 to acquire all the needed information for generating audience metrics. That is, while a majority of the metadata tags from the series of metadata tags 300 of FIG. 3 are omitted in the series of metering data 400 of FIG. 4, all of the relevant information for audience measurement purposes contained in the series of metadata tags 300 of FIG. 3 is preserved in the series of metering data 400 of FIG. 4. For example, the timestamps 344 of the first and last metadata tag 310, 324 of the first set of metadata tags 302 can be used to identify the beginning and end of the streaming of the media associated with the first URL 306. Further, the media identifier 346 of the first and last metadata tag 310, 324 of the first set of metadata tags 302 can be used to identify the media associated with the first URL 306 (or at least the station to then look up the particular media). Likewise, the first and last metadata tag 326, 336 of the second set of metadata tags 304 can be used to identify the beginning and end of the streaming media and the particular media being streamed. While the timestamp 344 of the intermediate metadata tags 312, 314, 316, 318, 320, 322, 328, 330, 332, 334 are not provided in the series of metering data 400 of FIG. 4, such information is unnecessary to fully identify the media to which user(s) were exposed and the duration or timing of the exposure(s).

Figure 5:
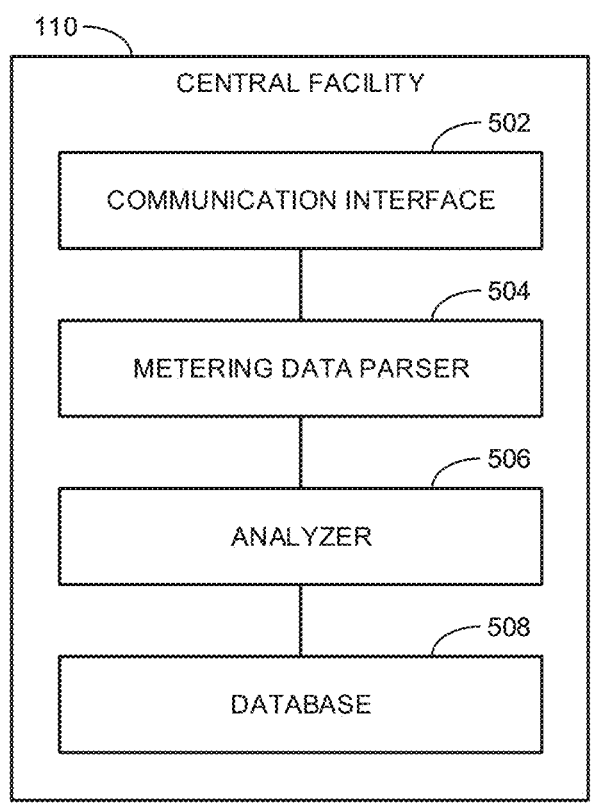
FIG. 5 is a block diagram of an example implementation of the example central facility of FIG. 1.

FIG. 5 is a block diagram of an example implementation of the example central facility 110 of FIG. 1. The central facility 110 of the illustrated example of FIG. 5 includes an example communication interface 502, an example metering data parser 504, an example analyzer 506, and an example database 508.

In the illustrated example, the communication interface 502, which may be implemented by a modem or other communication device, serves to communicate with one or more of the media provider 102, the service provider 114, or the presentation device 104. In some examples, the central facility 110 provides watermarks via the communication interface 502 to the media provider 102 for embedding in the media provided to end users by the service providers 114. In some examples, the communication interface 502 of the central facility 110 receives the metering data transmitted from the presentation device 104. In some examples, the received metering data is stored on the example database 508. In some examples, the central facility 110 provides the software development kit 116 to the service provider 114. In some examples, the central facility 110 provides the media monitor 108 via the communication interface 502 for implementation on the presentation device 104. In some examples, the communication interface 502 provides the media monitor 108 to third party application developers to be embedded or incorporated into developed applications that may subsequently be downloaded and/or installed by a user on the presentation device 104. In some examples, the communication interface 502 provides the media monitor 108 directly to an end user for execution on the presentation device 104.

The example metering data parser 504 of FIG. 5 is implemented by a logic circuit such as a processor executing instructions, but it could additionally or alternatively be implemented by an analog circuit, an ASIC, DSP, FPGA, and/or other circuitry. In some examples, the communication interface 502 and the metering data parser 504 are implemented by the same physical processor. In the illustrated example, the metering data parser 504 parses the collected metering data to determine what portions are metadata tags and what portions are media event tags.

The example analyzer 506 of FIG. 5 is implemented by a logic circuit such as a processor executing instructions, but it could additionally or alternatively be implemented by an analog circuit, an ASIC, DSP, FPGA, and/or other circuitry. In some examples, the communication interface 502, the metering data parser 504, and the analyzer 506 are implemented by the same physical processor. In the illustrated example, the analyzer 506 analyzes the metering data to determine the exposure of a user to the media presented on the presentation device 104 for the purpose of generating audience measurement reports. In some examples, the analyzer 506 determines the particular media being presented on the presentation device based on the media identifier 346 contained in the metadata tags associated with the media. For example, the central facility may look up a programming schedule (e.g., stored in the example database 508) corresponding to the particular station identifier (SID) in the media identifier 346 to determine the particular content being streamed at the time indicated in the timestamp 344. In some examples, where the media identifier 346 is content specific (e.g., uniquely identifies a particular program), the central facility 110 may look up the corresponding content in a database (e.g., the database 508).

Further, in some examples, the analyzer 506 determines the beginning and ending of streaming the media based on the timestamp 344 of the first and last metadata tags associated with the particular media. In some examples, the analyzer 506 identifies the first and last metadata tags based on associated URL events. In some examples, the analyzer 506 identifies URL events based on URL event tags included in the metering data. In some examples, the metering data does not include URL event tags. In some such examples, the analyzer 506 identifies URL events based on a comparison of adjacent metadata tags. For example, the analyzer 506 may determine that a URL event has occurred when the media identifiers 346 of adjacent metadata tags are different. In addition to identifying the beginning and ending of streaming of the media, the example analyzer 506 may also determine any changes to the operating mode of the media presentation device (e.g., a sudden stopping of the media without a URL change based on player state events indicated by player state event tags). In this manner, the analyzer 506 can generate the same audience metrics as would be available if all metadata tags were transmitted but with far less data being transmitted. As a result, the central facility 110 is enabled to receive exposure data from a much larger population (e.g., census wide) without significant demands on increased bandwidth of the servers of the central facility 110 through which the metering data is received. Additionally, in some examples, the analyzer 506 processes demographics information collected (directly or indirectly) from the audience members to correlate with the exposure data to generate ratings data and/or other audience measurement reports.

While an example manner of implementing the central facility 110 of FIG. 1 is illustrated in FIG. 5, one or more of the elements, processes and/or devices illustrated in FIG. 5 may be combined, divided, re-arranged, omitted, eliminated and/or implemented in any other way. Further, the example communication interface 502, the example metering data parser 504, the example analyzer 506, the example database 508, and/or, more generally, the example central facility 110 of FIG. 5 may be implemented by hardware, software, firmware and/or any combination of hardware, software and/or firmware. Thus, for example, any of the example communication interface 502, the example metering data parser 504, the example analyzer 506, the example database 508, and/or, more generally, the example central facility 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 502, the example metering data parser 504, the example analyzer 506, and/or the example database 508 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 110 of FIG. 1 may include one or more elements, processes and/or devices in addition to, or instead of, those illustrated in FIG. 5, and/or may include more than one of any or all of the illustrated elements, processes and devices.

Figure 6:
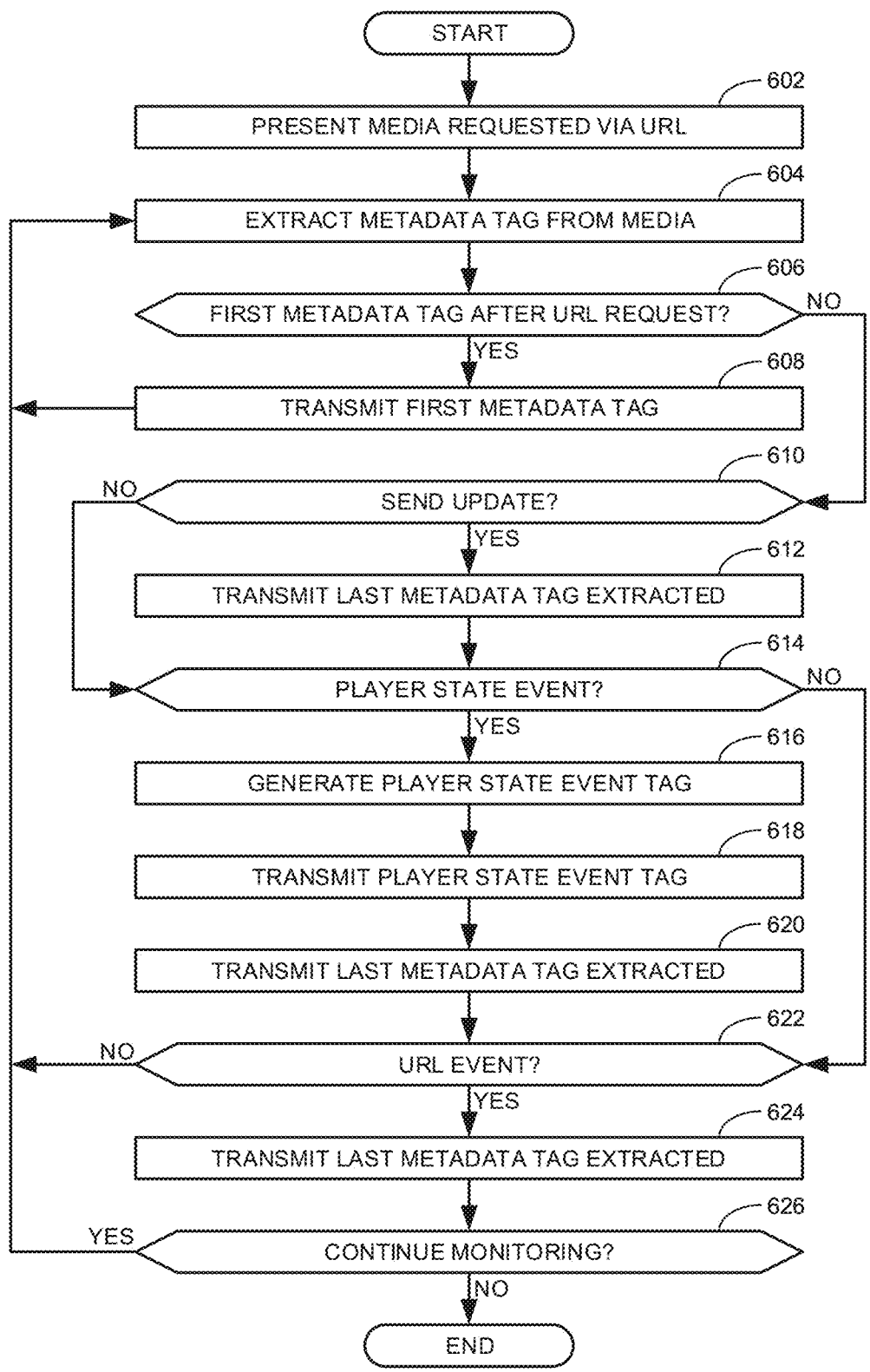
FIG. 6 is a flowchart representative of example machine-readable instructions that may be executed to implement the example media monitor of FIGS. 1 and/or 2.

A flowchart representative of example machine readable instructions for implementing the media monitor 108 of FIGS. 1 and/or 2 is shown in FIG. 6. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example media monitor 108 may alternatively be used. For example, the order of execution of the blocks may be changed, and/or some of the blocks described may be changed, eliminated, or combined.

Turning in detail to FIG. 6, the example program begins at block 602 where the example media tracker 202 presents media requested via a URL. At block 604, the example metadata extractor 204 extracts a metadata tag from the media. At block 606, the example metadata selector 212 determines whether the extracted metadata tag is the first metadata tag after the URL request. If the example metadata selector 212 determines that the extracted metadata tag is the first metadata tag after the URL request, then the metadata selector 212 selects the metadata tag for transmission and control advances to block 608. At block 608, the example transmitter 216 transmits the first metadata tag (e.g., to the central facility 110) and then control returns to block 604 where the metadata extractor 204 extracts subsequent metadata tags from the media. If the example metadata selector 212 determines (at block 606) that the extracted metadata tag is not the first metadata tag after the URL request, control advances to block 610.

At block 610, the example metadata selector determines whether to send an update. In some examples, an update is sent if a threshold amount of time has elapsed or a threshold number of metadata tags have been extracted without selection for transmission to the central facility. If the example metadata selector determines to send an update, control advances to block 612 where the example transmitter 216 transmits the last metadata tag extracted. That is, in some examples, when an update is to be sent, the metadata selector 212 selects the most recent metadata tag extracted by the metadata extractor 204 for transmission to the central facility. After the last metadata tag extracted is transmitted (block 612) control advances to block 614. If the example metadata selector determines not to send an update, control advances directly to block 614.

At block 614, the example player state detector 206 determines whether a player state event has occurred. In some examples, a player state event corresponds to a change in the state of the media player presenting the media. If the example player state detector 206 determines that a player state event has occurred, control advances to block 616 where the example event tag generator 210 generates a player state event tag. At block 618, the example transmitter 216 transmits the player state event tag. At block 620, the example transmitter 216 transmits the last (e.g., most recent) metadata tag extracted. Additionally or alternatively, in some examples, the transmitter 216 transmits the first (e.g., next) metadata tag extracted after the player state event. Control then advances to block 622. Returning to block 614, if the example player state detector 206 determines that a player state event has not occurred, control advances directly to block 622.

At block 622, the example URL event detector 208 determines whether a URL event has occurred. In some examples, a URL event corresponds to a change in the URL requested by a user via the presentation device 104. If the example URL event detector 208 determines that no URL event has occurred, control returns to block 604 to continue extracting metadata from the media. If the example URL event detector 208 determines (at block 622) that a URL event has occurred, control advances to block 624 where the example transmitter 216 transmits the last metadata tag extracted (e.g., the most recent metadata tag extracted before the URL event). At block 626, the example program determines whether to continue monitoring for metadata. If monitoring is to continue, control returns to block 604. If monitoring is not to continue, the example program ends.

Figure 7:
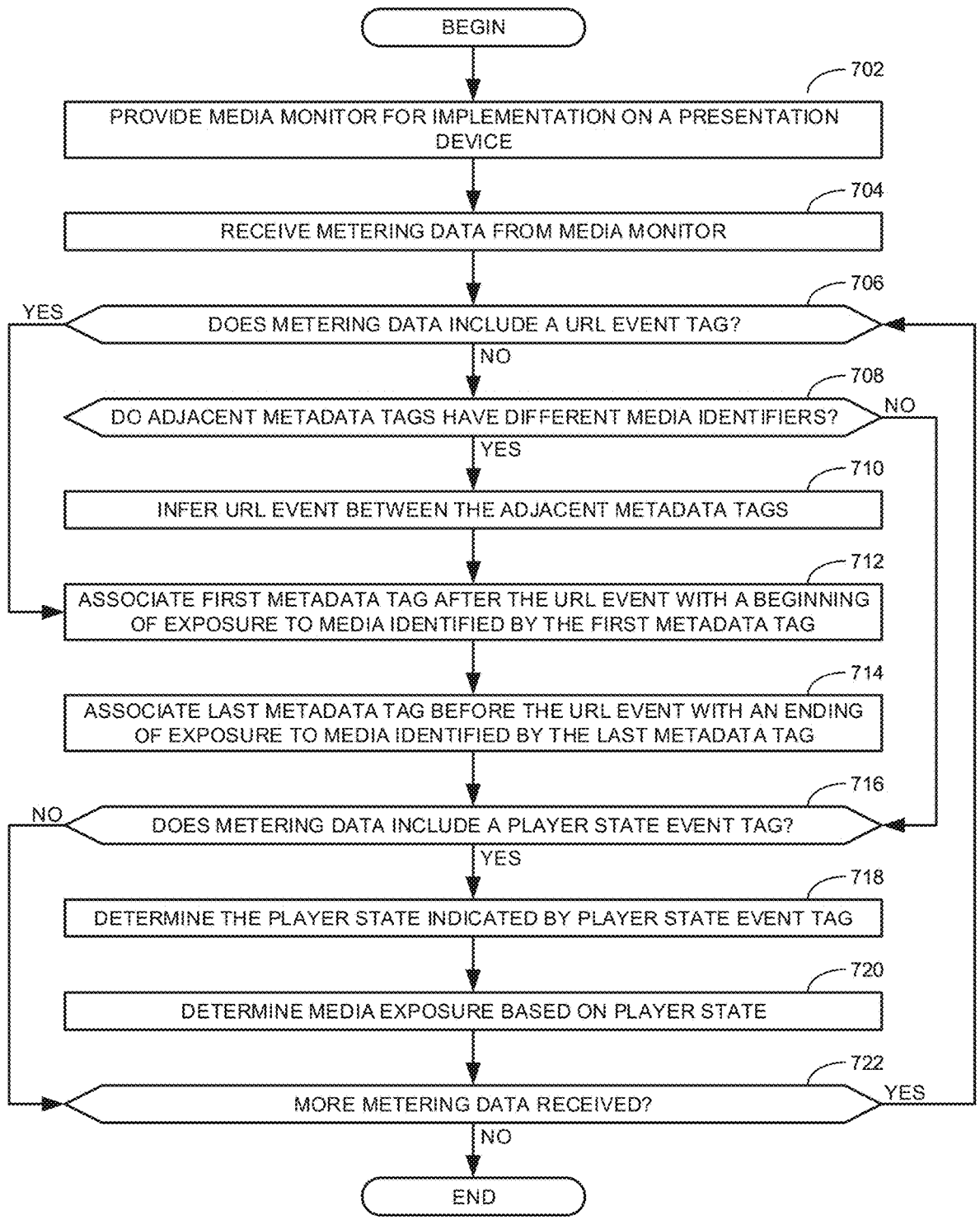
FIG. 7 is a flowchart representative of example machine-readable instructions that may be executed to implement the example central facility of FIGS. 1 and/or 5.

A flowchart representative of example machine readable instructions for implementing the central facility 110 of FIGS. 1 and/or 5 is shown in FIG. 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example central facility 110 may alternatively be used. For example, the order of execution of the blocks may be changed, and/or some of the blocks described may be changed, eliminated, or combined.

Turning in detail to FIG. 7, the example program begins at block 702 where the example communication interface 502 provides a media monitor (e.g., the media monitor 108) for implementation on a presentation device (e.g., the presentation device 104). In some examples, the communication interface 502 provides the media monitor 108 directly to a user for implementation on the presentation device 104. In other examples, the communication interface 502 provides the media monitor 108 to a third party developer for inclusion in an application that may subsequently be implemented on the presentation device 104. At block 704, the example communication interface 502 receives metering data from the media monitor 108.

At block 706, the example metering data parser 504 determines whether the metering data includes a URL event tag. If the example metering data parser 504 determines that the metering data does not include a URL event tag, control advances to block 708. At block 708, the example analyzer 506 determines whether adjacent metadata tags have different media identifiers (e.g., the media identifiers 346). If the example analyzer 506 determines that the adjacent metadata tags do have different media identifiers, control advances to block 710 where the example analyzer 506 infers a URL event between the adjacent metadata tags. At block 712, the example analyzer 506 associates the first metadata tag after the URL event with a beginning of exposure to media identified by the first metadata tag. Returning to block 706, if the example metering data parser 504 determines that the metering data does include a URL event tag, control advances directly to block 712. At block 714, the example analyzer 506 associates the metadata tag immediately preceding the URL event with an ending of exposure to media identified by the last metadata tag. Control then advances to block 716. Returning to block 708, if the example analyzer 506 determines that the adjacent metadata tags do not have different media identifiers, control advances directly to block 716.

At block 716, the example metering data parser 504 determines whether the metering data includes a player state event tag. If the example metering data parser 504 determines that the metering data does include a player state event tag, control advances to block 718 where the example analyzer 506 determines the player state indicated by the player state invent tag. At block 720, the example analyzer 506 determines media exposure based on the player state. For example, if the player state event corresponds to a stopping of the media player, the example analyzer 506 determines that the user of the presentation device 104 is no longer being exposed to the media after the stop event. Control then advances to block 722. Returning to block 716, if the example metering data parser 504 determines that the metering data does not include a player state event tag, control advances directly to block 722. At block 722, the example communication interface 502 determines whether more metering data is received. If more metering data is received, control returns to block 706. If no more metering data is received, the example program of FIG. 8 ends.

As mentioned above, the example processes of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
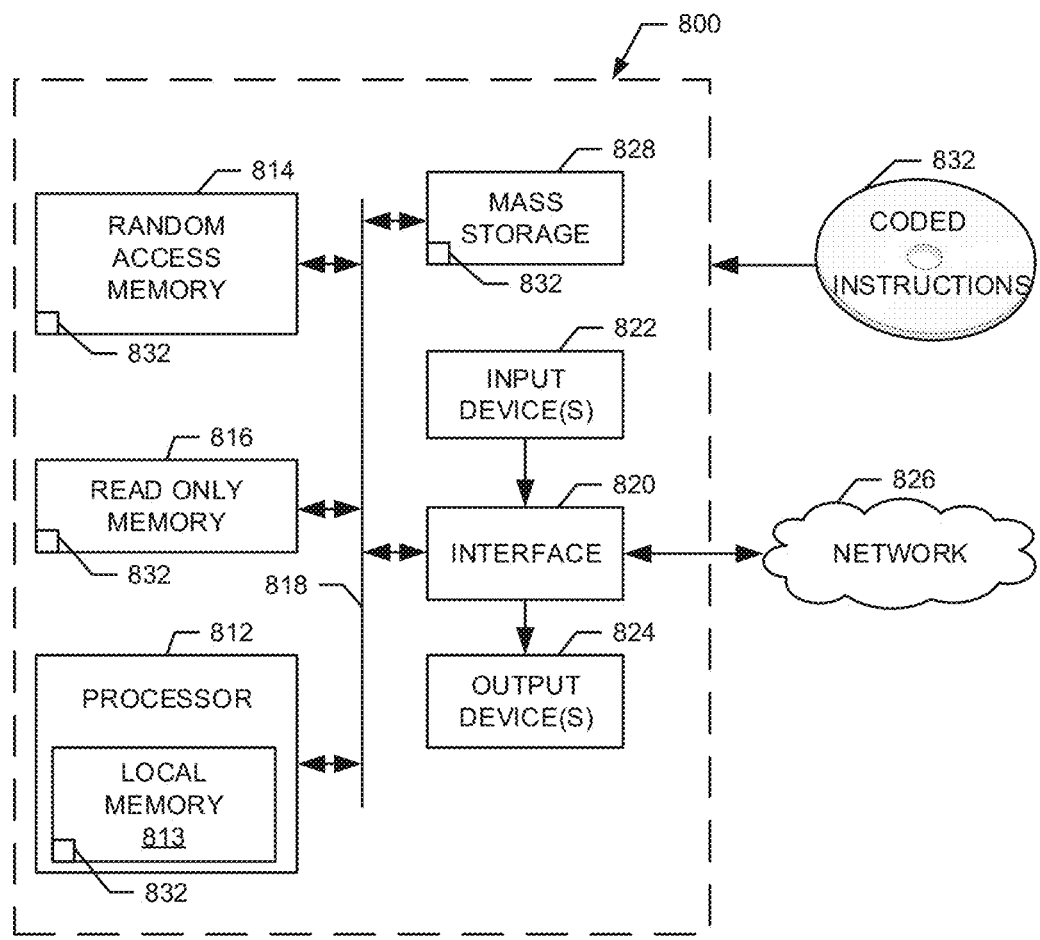
FIG. 8 is a block diagram of an example processor platform capable of executing the example machine-readable instructions of FIGS. 6 and/or 7 to implement the example media monitor of FIGS. 1 and/or 2, and/or the example central facility of FIGS. 1 and/or 5.

FIG. 8 is a block diagram of an example processor platform 800 capable of executing the instructions of FIGS.

6 and/or 7 to implement the media monitor 108 and/or the central facility 110 of FIG. 1. The processor platform 800 can be, for example, a server, a personal computer, a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6 and/or 7 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to notify a central facility of events on a presentation device, the apparatus comprising:
a metadata extractor to extract (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;
an event tag generator to:
determine, based on the extraction of the first set and the second set of metadata tags, that the second media sequence is presented in place of the first media sequence on the presentation device; and
generate a media event tag including information corresponding to presentation of the second media sequence in place of the first media sequence on the presentation device;
a metadata selector to select a subset of the first set and the second set of metadata tags; and
a transmitter to transmit the media event tag and the subset to the central facility, at least one of the metadata extractor, the event tag generator, the metadata selector, or the transmitter includes hardware.

2. The apparatus as defined in claim 1, wherein the presentation device includes the apparatus, and wherein the presentation device is a smart television.

3. The apparatus as defined in claim 1, wherein the metadata extractor is to detect a timestamp corresponding to the first media sequence.

4. The apparatus as defined in claim 3, wherein the timestamp is to identify a duration of exposure of the first media sequence by a user of the presentation device.

5. The apparatus as defined in claim 1, further including a media tracker to detect a first trigger associated with the first media sequence presented on the presentation device.

6. The apparatus as defined in claim 1, further including a player state detector to detect a state of the presentation device.

7. The apparatus as defined in claim 6, wherein the player state detector is to detect the state as at least one of play, pause, stop, replay, rewind, forward or skip.

8. The apparatus as defined in claim 1, further including a player state detector to detect a latency between (a) a broadcast of the first media sequence or the second media sequence and (b) presentation of the first media sequence or the second media sequence on the presentation device.

9. The apparatus as defined in claim 1, wherein the metadata extractor is to extract at least one of the first set of the metadata tags or the second set of the metadata tags from a service provider stream.

10. The apparatus as defined in claim 1, wherein the metadata extractor is to extract at least one of the first set of the metadata tags or the second set of the metadata tags from at least one of a code or an ID3 tag.

11. The apparatus as defined in claim 1, wherein the metadata extractor is to extract at least one of the first set of the metadata tags or the second set of the metadata tags from an audio watermark.

12. The apparatus as defined in claim 1, wherein the metadata extractor is to extract at least one of the first set of the metadata tags or the second set of the metadata tags from a video watermark.

13. The apparatus as defined in claim 1, wherein the metadata extractor includes a watermark extractor to:
extract watermark information from the first media sequence and the second media sequence; and
derive, from the extracted watermark information, the first set and the second set of metadata tags.

14. The apparatus as defined in claim 1, further including a player state detector to:
detect a player state of the presentation device during presentation of the second media sequence; and
in response to detecting a change in the player state of the presentation device during presentation of the second media sequence, trigger a second media event tag to be generated, the second media event tag corresponding to the change in the player state of the presentation device.

15. A non-transitory computer readable medium comprising instructions that, when executed, cause a processor to at least:
extract (i) a first set of metadata tags from a first media sequence presented on a presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;
determine, based on the extraction of the first set and the second set of metadata tags, that the second media sequence is presented in place of the first media sequence on the presentation device;
generate a media event tag including information corresponding to presentation of second media sequence in place of the first media sequence on the presentation device;
select a subset of the first set and the second set of metadata tags; and
cause transmission of the media event tag and the subset to a central facility.

16. The non-transitory computer readable medium as defined in claim 15, wherein the instructions, when executed, cause the processor to detect a timestamp corresponding to the first media sequence.

17. The non-transitory computer readable medium as defined in claim 16, wherein the instructions, when executed, cause the processor to identify, with the timestamp, a duration of exposure of the first media sequence by a user of the presentation device.

18. The non-transitory computer readable medium as defined in claim 15, wherein the instructions, when executed, cause the processor to detect a first trigger associated with the first media sequence presented on the presentation device.

19. The non-transitory computer readable medium as defined in claim 15, wherein the instructions, when executed, cause the processor to detect a state of the presentation device.

20. The non-transitory computer readable medium as defined in claim 19, wherein the instructions, when executed, cause the processor to detect the state as at least one of play, pause, stop, replay, rewind, forward or skip.

21. The non-transitory computer readable medium as defined in claim 15, wherein the instructions, when executed, cause the processor to detect a latency between (a) a broadcast of the first media sequence or the second media sequence and (b) presentation of the first media sequence or the second media sequence on the presentation device.

22. The non-transitory computer readable medium as defined in claim 15, wherein the instructions, when executed, cause the processor to extract at least one of the first set of the metadata tags or the second set of the metadata tags from a service provider stream.

23. The non-transitory computer readable medium as defined in claim 15, wherein the instructions, when executed, cause the processor to extract at least one of the first set of the metadata tags or the second set of the metadata tags from at least one of a code or an ID3 tag.

24. The non-transitory computer readable medium as defined in claim 15, wherein the instructions, when executed, cause the processor to extract at least one of the first set of the metadata tags or the second set of the metadata tags from an audio watermark.

25. The non-transitory computer readable medium as defined in claim 15, wherein the instructions, when executed, cause the processor to extract at least one of the first set of the metadata tags or the second set of the metadata tags from a video watermark.

26. The non-transitory computer readable medium as defined in claim 15, wherein the instructions, when executed, cause the processor to:
extract watermark information from the first media sequence and the second media sequence; and
derive, from the extracted watermark information, the first set and the second set of metadata tags.

27. The non-transitory computer readable medium as defined in claim 15, wherein the instructions, when executed, cause the processor to:
detect a player state of the presentation device during presentation of the second media sequence; and
in response to detecting a change in the player state of the presentation device during presentation of the second media sequence, trigger a second media event tag to be generated, the second media event tag corresponding to the change in the player state of the presentation device.

28. A computer-implemented method to notify a central facility of events on a presentation device, the method comprising:
extracting, by executing an instruction with at least one processor, (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;
determining, by executing an instruction with the at least one processor, based on the extraction of the first set and the second set of metadata tags, that the second media sequence is presented in place of the first media sequence on the presentation device;
generating, by executing an instruction with the at least one processor, a media event tag including information corresponding to presentation of the second media sequence in place of the first media sequence on the presentation device;
selecting, by executing an instruction with the at least one processor, a subset of the first set and the second set of metadata tags; and
causing, by executing an instruction with the at least one processor, transmission of the media event tag and the subset to a central facility.

29. The computer-implemented method as defined in claim 28, wherein the presentation device is a smart television.

30. The computer-implemented method as defined in claim 28, further including detecting a timestamp corresponding to the first media sequence.

31. The computer-implemented method as defined in claim 30, further including identifying, with the timestamp, a duration of exposure of the first media sequence by a user of the presentation device.

32. The computer-implemented method as defined in claim 28, further including detecting a first trigger associated with the first media sequence presented on the presentation device.

33. The computer-implemented method as defined in claim 28, further including detecting a state of the presentation device.

34. The computer-implemented method as defined in claim 33, wherein the state of the presentation device includes at least one of play, pause, stop, replay, rewind, forward or skip.

35. The computer-implemented method as defined in claim 28, further including detecting a latency between (a) a broadcast of the first media sequence or the second media sequence and (b) presentation of the first media sequence or the second media sequence on the presentation device.

36. The computer-implemented method as defined in claim 28, further including extracting at least one of the first set of the metadata tags or the second set of the metadata tags from a service provider stream.

37. The computer-implemented method as defined in claim 28, further including extracting at least one of the first set of the metadata tags or the second set of the metadata tags from at least one of a code or an ID3 tag.

38. The computer-implemented method as defined in claim 28, further including extracting at least one of the first set of the metadata tags or the second set of the metadata tags from an audio watermark.

39. The computer-implemented method as defined in claim 28, further including extracting at least one of the first set of the metadata tags or the second set of the metadata tags from a video watermark.

40. The computer-implemented method as defined in claim 28, further including:
extracting watermark information from the first media sequence and the second media sequence; and
deriving, from the extracted watermark information, the first set and the second set of metadata tags.

41. The computer-implemented method as defined in claim 28, further including:
detecting a player state of the presentation device during presentation of the second media sequence; and
in response to detecting a change in the player state of the presentation device during presentation of the second media sequence, triggering a second media event tag to be generated, the second media event tag corresponding to the change in the player state of the presentation device.

42. An apparatus to notify a central facility of events on a presentation device, the apparatus comprising:
memory;
instructions included in the apparatus; and
processor circuitry to execute the instructions to:
extract (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;
determine, based on the extraction of the first set and the second set of metadata tags, that the second media sequence is presented in place of the first media sequence on the presentation device;
generate a media event tag including information corresponding to presentation of the second media sequence in place of the first media sequence on the presentation device;
select a subset of the first set and the second set of metadata tags; and
transmit the media event tag and the subset to the central facility.

43. The apparatus of claim 42, wherein the processor circuitry is to:
extract watermark information from the first media sequence and the second media sequence; and
derive, from the extracted watermark information, the first set and the second set of metadata tags.

44. An apparatus to notify a central facility of events on a presentation device, the apparatus comprising:
a metadata extractor to extract (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;
an event tag generator to:
determine, based on the extraction of the first set and the second set of metadata tags, that the second media sequence is presented in place of the first media sequence on the presentation device; and
when a trigger includes a change in a uniform resource locator corresponding to the second media sequence, generate a media event tag including information corresponding to presentation of the second media sequence in place of the first media sequence on the presentation device; and
a transmitter to transmit the media event tag to the central facility, at least one of the metadata extractor, the event tag generator, or the transmitter includes hardware.

45. A non-transitory computer readable medium comprising instructions that, when executed, cause a processor to at least:
extract (i) a first set of metadata tags from a first media sequence presented on a presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;

determine, based on the extraction of the first set and the second set of metadata tags, that the second media sequence is presented in place of the first media sequence on the presentation device;

when a trigger includes a change in a uniform resource locator corresponding to the second media sequence, generate a media event tag including information corresponding to presentation of second media sequence in place of the first media sequence on the presentation device; and cause transmission of the media event tag to a central facility.

46. A computer-implemented method to notify a central facility of events on a presentation device, the method comprising:

extracting, by executing an instruction with the at least one processor, (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;

determining, by executing an instruction with the at least one processor, based on the extraction of the first set and the second set of metadata tags, that the second media sequence is presented in place of the first media sequence on the presentation device;

when a trigger includes a change in a uniform resource locator corresponding to the second media sequence, generating, by executing an instruction with the at least one processor, a media event tag including information corresponding to presentation of the second media sequence in place of the first media sequence on the presentation device; and causing transmission of the media event tag to a central facility.

47. An apparatus to notify a central facility of events on a presentation device, the apparatus comprising:

memory;

instructions included in the apparatus; and processor circuitry to execute the instructions to:

extract (i) a first set of metadata tags from a first media sequence presented on the presentation device, respective ones of the first set of metadata tags including information corresponding to the first media sequence, and (ii) a second set of metadata tags from a second media sequence presented on the presentation device, respective ones of the second set of metadata tags including information corresponding to the second media sequence;

determine, based on the extraction of the first set and the second set of metadata tags, that the second media sequence is presented in place of the first media sequence on the presentation device;

when a trigger includes a change in a uniform resource locator corresponding to the second media sequence, generate a media event tag including information corresponding to presentation of the second media sequence in place of the first media sequence on the presentation device; and transmit the media event tag to the central facility.

48. The apparatus of claim 47, wherein the processor circuitry is to:

detect a player state of the presentation device during presentation of the second media sequence; and in response to detecting a change in the player state of the presentation device during presentation of the second media sequence, trigger a second media event tag to be generated, the second media event tag corresponding to the change in the player state of the presentation device.

* * * * *